United States Patent
Koch et al.

(10) Patent No.: US 12,093,359 B2
(45) Date of Patent: Sep. 17, 2024

(54) ELECTRONIC DEVICE HAVING A SEALED BIOMETRIC INPUT SYSTEM

(71) Applicant: Apple Inc., Cupertino, CA (US)

(72) Inventors: Timothy D. Koch, San Jose, CA (US); Dylan L. Magida, San Francisco, CA (US); Michael B. Wittenberg, San Francisco, CA (US); Henry H. Yang, Los Gatos, CA (US); Alvin T. Chang, San Francisco, CA (US); Steven C. Roach, San Francisco, CA (US); Jared P. Ostdiek, San Francisco, CA (US)

(73) Assignee: APPLE INC., Cupertino, CA (US)

(*) Notice: Subject to any disclaimer, the term of this patent is extended or adjusted under 35 U.S.C. 154(b) by 230 days.

(21) Appl. No.: 17/471,031

(22) Filed: Sep. 9, 2021

(65) Prior Publication Data

US 2022/0100833 A1 Mar. 31, 2022

Related U.S. Application Data

(60) Provisional application No. 63/209,769, filed on Jun. 11, 2021, provisional application No. 63/083,610, filed on Sep. 25, 2020.

(51) Int. Cl.
*H04M 1/72* (2021.01)
*G06F 1/16* (2006.01)
(Continued)

(52) U.S. Cl.
CPC .......... *G06F 21/32* (2013.01); *G06F 1/1626* (2013.01); *G06F 1/1656* (2013.01); *G06V 40/13* (2022.01);
(Continued)

(58) Field of Classification Search
CPC .. H04M 1/72466; H04M 1/026; H04M 1/236; H04M 2250/12; G06V 40/13;
(Continued)

(56) References Cited

U.S. PATENT DOCUMENTS 6,834,181 B2  12/2004  Kaikuranta et al.
6,853,336 B2  2/2005  Asano et al.
(Continued)

FOREIGN PATENT DOCUMENTS

CN  06977392 U  2/2018
CN  108200238  6/2018
(Continued)

OTHER PUBLICATIONS

White et al., "Quantitative Descriptors of Corneal Topography: A Clinical Study," Archives of Ophthalmology, vol. 109, No. 3, Mar. 1991, pp. 349-353.
(Continued)

*Primary Examiner* — Khawar Iqbal
(74) *Attorney, Agent, or Firm* — Brownstein Hyatt Farber Schreck, LLP

(57) ABSTRACT

A portable electronic device may include a housing member defining a side surface of the portable electronic device, a portion of the housing member defining a side wall of a hole extending through the housing member, a button member positioned along the side surface and defining a chassis portion and a hollow post extending into the hole defined through the housing member, and a first waterproof seal defined between the hollow post and the side wall of the hole. The portable electronic device may also include a biometric sensing component coupled to the chassis portion, a flexible circuit element extending through the hollow post and conductively coupling the biometric sensing component
(Continued)

to a component within the housing, and a second waterproof seal defined within the hollow post.

20 Claims, 19 Drawing Sheets

(51) Int. Cl.
  *G06F 21/32* (2013.01)
  *G06V 40/13* (2022.01)
  *H04B 1/3827* (2015.01)
  *H04M 1/02* (2006.01)
  *H04B 1/38* (2015.01)

(52) U.S. Cl.
  CPC ... *H04B 1/3827* (2013.01); *H04B 2001/3894* (2013.01)

(58) Field of Classification Search
  CPC .. H01H 13/81; H01H 13/86; H01H 2223/002; H03K 17/975; G06F 21/32; G06F 1/1684; G06F 1/1656; G06F 1/1626; H04B 1/3827; H04B 2001/3894
  See application file for complete search history.

(56) References Cited

U.S. PATENT DOCUMENTS

| | | | |
|---|---|---|---|
| 7,142,827 B2 | 11/2006 | Dufosse et al. | |
| 7,452,077 B2 | 11/2008 | Meyer et al. | |
| 7,463,756 B2 | 12/2008 | Benkley et al. | |
| 7,474,799 B2 | 1/2009 | Bassi et al. | |
| 7,620,175 B2 | 11/2009 | Black et al. | |
| 8,207,897 B2 | 6/2012 | Alvey et al. | |
| 8,553,874 B2 | 10/2013 | Holmes et al. | |
| 9,030,440 B2 | 5/2015 | Pope et al. | |
| 9,501,685 B2 | 11/2016 | Bernstein et al. | |
| 9,524,413 B2 | 12/2016 | Kim | |
| 9,651,513 B2 | 5/2017 | Dunlap et al. | |
| 9,697,409 B2 | 7/2017 | Myers | |
| 9,767,971 B2 | 9/2017 | Hisano | |
| 9,811,713 B2 | 11/2017 | Pi et al. | |
| 9,876,273 B2 | 1/2018 | Lui et al. | |
| 9,922,229 B2 | 3/2018 | Cao et al. | |
| 9,924,004 B2 | 3/2018 | Park | |
| 9,947,259 B2 | 4/2018 | Wu et al. | |
| 9,959,444 B2 | 5/2018 | Young et al. | |
| 10,007,343 B2 | 6/2018 | Kim | |
| 10,049,251 B2 | 8/2018 | Cao et al. | |
| 10,054,430 B2 | 8/2018 | Mor et al. | |
| 10,068,396 B2 | 9/2018 | Koo | |
| 10,128,907 B2 | 11/2018 | He | |
| 10,146,304 B2 | 12/2018 | Werblin et al. | |
| 10,146,982 B2 | 12/2018 | Hsu | |
| 10,198,131 B2 | 2/2019 | Yang et al. | |
| 10,201,273 B2 | 2/2019 | Choukroun et al. | |
| 10,204,262 B2 | 2/2019 | Price et al. | |
| 10,235,582 B2 | 3/2019 | Neumann et al. | |
| 10,356,500 B2 | 7/2019 | Kim | |
| 10,361,851 B2 | 7/2019 | Wu | |
| 10,375,365 B2 | 8/2019 | Perdices-Gonzalez et al. | |
| 10,401,158 B2 | 9/2019 | Gernoth et al. | |
| 10,425,561 B2 | 9/2019 | Jarvis et al. | |
| 10,430,630 B2 | 10/2019 | Zhang | |
| 10,469,722 B2 | 11/2019 | Trail | |
| 10,542,245 B2 | 1/2020 | Cho et al. | |
| 10,564,521 B1 | 2/2020 | Zhu | |
| 10,606,218 B1 | 3/2020 | Ely et al. | |
| 10,656,596 B2 | 5/2020 | Callagy et al. | |
| 10,657,237 B2 | 5/2020 | Alameh et al. | |
| 10,679,448 B2 | 6/2020 | Koo | |
| 10,699,094 B2 | 6/2020 | Shim et al. | |
| 10,721,348 B2 | 7/2020 | Choi et al. | |
| 10,775,628 B2 | 9/2020 | Samec et al. | |
| 10,824,203 B2 | 11/2020 | Wong et al. | |
| 10,832,043 B2 | 11/2020 | Fidaleo | |
| 10,839,194 B2 | 11/2020 | Jung et al. | |
| 10,901,310 B2 | 1/2021 | Ma et al. | |
| 10,909,709 B2 | 2/2021 | Ryu et al. | |
| 10,943,527 B2 | 3/2021 | Lee et al. | |
| 10,949,637 B2 | 3/2021 | Kang et al. | |
| 10,977,351 B2 | 4/2021 | Alameh et al. | |
| 10,990,792 B2 | 4/2021 | Park et al. | |
| 11,049,271 B2 | 6/2021 | Xu et al. | |
| 11,100,204 B2 | 8/2021 | Alameh et al. | |
| 11,189,248 B1 | 11/2021 | Lee et al. | |
| 11,202,385 B2* | 12/2021 | Kim | H05K 5/0017 |
| 11,209,146 B2 | 12/2021 | Chang et al. | |
| 11,233,924 B2 | 1/2022 | Noh et al. | |
| 11,258,163 B2 | 2/2022 | Froese et al. | |
| 11,275,920 B1 | 3/2022 | Sargent et al. | |
| 11,282,282 B2 | 3/2022 | Simpkinson et al. | |
| 11,310,400 B2 | 4/2022 | Choi et al. | |
| 11,317,147 B2 | 4/2022 | Alameh et al. | |
| 11,324,135 B2* | 5/2022 | Kim | H05K 5/069 |
| 11,330,351 B2 | 5/2022 | Su et al. | |
| 11,436,964 B1 | 9/2022 | Wang | |
| 11,436,997 B2 | 9/2022 | Wu | |
| 11,476,883 B2 | 10/2022 | Kumar et al. | |
| 11,512,836 B2 | 11/2022 | Rossi et al. | |
| 11,546,453 B2 | 1/2023 | Wang | |
| 11,561,577 B2* | 1/2023 | Cho | G06F 1/1643 |
| 11,808,537 B2 | 11/2023 | Teetzel et al. | |
| 2007/0049326 A1 | 3/2007 | Kim | |
| 2007/0188863 A1 | 8/2007 | Sun et al. | |
| 2008/0102963 A1 | 5/2008 | Flagg et al. | |
| 2009/0066345 A1 | 3/2009 | Klauk et al. | |
| 2012/0330769 A1 | 12/2012 | Arceo | |
| 2013/0313087 A1 | 11/2013 | Le | |
| 2014/0137054 A1 | 5/2014 | Gandhi et al. | |
| 2014/0282285 A1 | 9/2014 | Sadhvani et al. | |
| 2015/0242638 A1 | 8/2015 | Bitran et al. | |
| 2015/0302773 A1 | 10/2015 | Stone et al. | |
| 2015/0309316 A1 | 10/2015 | Osterhout et al. | |
| 2016/0282977 A1 | 9/2016 | Moua et al. | |
| 2016/0283666 A1 | 9/2016 | Kutscher et al. | |
| 2017/0154742 A1* | 6/2017 | Hisano | H04M 1/236 |
| 2017/0372123 A1 | 12/2017 | Kim et al. | |
| 2018/0082102 A1 | 3/2018 | Lee et al. | |
| 2019/0130082 A1 | 5/2019 | Alameh et al. | |
| 2019/0179409 A1 | 6/2019 | Jones et al. | |
| 2019/0346687 A1 | 11/2019 | Zheng | |
| 2019/0392724 A1 | 12/2019 | Breed et al. | |
| 2020/0118456 A1 | 4/2020 | Breed | |
| 2020/0126243 A1 | 4/2020 | Bleyer et al. | |
| 2020/0137911 A1* | 4/2020 | Kim | H05K 5/0247 |
| 2020/0174255 A1 | 6/2020 | Hollands et al. | |
| 2020/0174284 A1 | 6/2020 | Chan et al. | |
| 2020/0265212 A1* | 8/2020 | Jung | H04B 1/3888 |
| 2021/0006933 A1 | 1/2021 | Dean | |
| 2021/0256244 A1 | 8/2021 | Bezot et al. | |
| 2021/0344675 A1 | 11/2021 | Cui et al. | |
| 2022/0012451 A1 | 1/2022 | Sargent et al. | |
| 2022/0059055 A1 | 2/2022 | Lee et al. | |
| 2022/0142136 A1 | 5/2022 | Kubota | |
| 2022/0252893 A1 | 8/2022 | Hsiao | |
| 2022/0283024 A1 | 9/2022 | Neevel et al. | |
| 2022/0284214 A1 | 9/2022 | Tomasetta et al. | |
| 2022/0329678 A1* | 10/2022 | Zhang | H04M 1/0262 |
| 2023/0118495 A1* | 4/2023 | Kim | A61B 5/00 600/301 |
| 2023/0386429 A1 | 11/2023 | Lee et al. | |
| 2024/0112494 A1 | 4/2024 | Sargent et al. | |

FOREIGN PATENT DOCUMENTS

| | | |
|---|---|---|
| CN | 08673354 U | 3/2019 |
| CN | 209594090 | 11/2019 |
| CN | 210721044 | 6/2020 |
| CN | 112420779 | 2/2021 |
| CN | 110196528 | 12/2021 |
| EP | 3644337 | 4/2020 |
| EP | 3739633 | 11/2020 |
| JP | 2007114406 | 5/2007 |

(56) References Cited

FOREIGN PATENT DOCUMENTS

| KR | 20100105004 | 9/2010 |
|---|---|---|
| KR | 20120013400 | 2/2012 |
| KR | 20190107490 | 9/2019 |
| KR | 20200015839 | 2/2020 |
| KR | 20200026000 | 3/2020 |
| WO | WO 19/213839 | 11/2019 |

OTHER PUBLICATIONS

Kim, "Apple iphone 12 'notch' disappearing . . . New Face ID test," industry, retrieved from https://nocutnews.co.kr/news/5232116, Oct. 23, 2019, 5 pages.
Yong, "Analysis of Apple IA Chip," UPI News, retrieved from https://www.upinews.kr/newsView/upi201807150003, Jul. 15, 2018, including non-official translation, 22 pages.
Borghi et al., "Driver Face Verification with Depth Maps," *Sensors*, 2019, vol. 19, No. 3361, pp. 1-16.
Huang et al., "Eyeglasses-free Display: Towards Correcting Visual Aberrations with Computational Light Field Displays," *ACM Transactions on Graphics*, vol. 33, No. 4, pp. 59:1-59:12, Jul. 2014.
Kakadiaris et al., "Multimodal Face Recognition: Combination of Geometry with Physiological Information," *IEEE Computer Society Conference on Computer Vision and Pattern Recognition*, Jun. 2005, VBPR '05, vol. 2, pp. 1022-1029.
Pamplona et al., "Tailored Displays to Compensate for Visual Aberrations," ACM Transactions on Graphics, vol. 31, No. 4, Article 81, Jul. 2012, pp. 81:1-81:12.
Sang et al., "Pose-Invariant Face Recognition via RGB-D Images," Computational Intelligence and Neuroscience, vol. 2016, Article ID 3563758, Oct. 2015, pp. 1-9.
U.S. Appl. No. 18/532,846, filed Dec. 7, 2023, Sargent et al.

\* cited by examiner

ELECTRONIC DEVICE HAVING A SEALED BIOMETRIC INPUT SYSTEM

CROSS-REFERENCE TO RELATED APPLICATIONS

This application is a nonprovisional of, and claims the benefit under 35 U.S.C. 119(e) of, U.S. Provisional Patent Application No. 63/209,769, filed Jun. 11, 2021, and U.S. Provisional Patent Application No. 63/083,610, filed Sep. 25, 2020, the contents of which are incorporated herein by reference as if fully disclosed herein.

FIELD

The subject matter of this disclosure relates generally to electronic devices, and more particularly, to electronic devices with environmentally-sealed biometric input systems for capturing images of fingerprints.

BACKGROUND

Modern consumer electronic devices take many shapes and forms, and have numerous uses and functions. Smartphones, for example, facilitate communications, productivity, entertainment, and the like. Such devices may include numerous systems to facilitate such functionality. For example, a smartphone may include a touch-sensitive display for providing graphical outputs and for accepting touch inputs, wireless communications systems for connecting with other devices to send and receive voice and data content, cameras for capturing photographs and videos, buttons for controlling device functions and providing other inputs to the device, and so forth. However, integrating these subsystems into a compact and reliable product that is able to withstand daily use presents a variety of technical challenges. The systems and techniques described herein may address many of these challenges while providing a device that offers a wide range of functionality.

SUMMARY

A portable electronic device may include a housing member defining a side surface of the portable electronic device, a portion of the housing member defining a side wall of a hole extending through the housing member, a button member positioned along the side surface and defining a chassis portion and a hollow post extending into the hole defined through the housing member, and a first waterproof seal defined between the hollow post and the side wall of the hole. The portable electronic device may also include a biometric sensing component coupled to the chassis portion, a flexible circuit element extending through the hollow post and conductively coupling the biometric sensing component to a component within the housing, and a second waterproof seal defined within the hollow post. The biometric sensing component may be configured to capture a representation of a fingerprint of a user and to authenticate the user using the representation of the fingerprint, and the portable electronic device may further include an input sensor configured to detect an input force applied to the button member. The first waterproof seal may include an O-ring. The second waterproof seal may include a potting material at least partially filling the hollow post.

The portable electronic device may further include a sapphire cap attached to the chassis portion and covering the biometric sensing component. The portable electronic device may further include a third waterproof seal between the sapphire cap and the chassis portion. The second waterproof seal may be formed from a first curable liquid having a first viscosity, and the third waterproof seal may be formed from a second curable liquid having a second viscosity that may be lower than the first viscosity.

A portable electronic device may include a housing member defining a side wall of a hole extending through the housing member, a display at least partially within the housing, a transparent cover over the display and coupled to the housing, and a button member positioned along a side of the housing member. The button member may define a chassis portion and a post extending from the chassis portion and positioned at least partially in the hole, the post defining a passage extending through the post from the chassis portion to an end of the post. The portable electronic device may further include a biometric sensing component coupled to the chassis portion, a flexible circuit element extending through the passage and conductively coupling the biometric sensing component to a component within the housing.

The hole may be a first hole, and the housing may define a second hole extending through the housing member, and the button member may further define an additional post extending from the chassis portion and positioned in the second hole. The additional post may be a solid post. The portable electronic device may further include an anti-roll bar retained to the housing and coupled to the hollow post and the additional post, the anti-roll bar configured to maintain uniform travel of the post and the additional post during actuation of the button member.

The portable electronic device may further include a sealing member in contact with an exterior surface of the post and the side wall of the hole and configured to inhibit ingress of liquid between the exterior surface of the post and the side wall of the hole. The portable electronic device may further include a potting material within the passage and at least partially encapsulating the flexible circuit element, and the potting material may be configured to inhibit ingress of liquid through the passage. The potting material may at least partially encapsulate the biometric sensing component.

The portable electronic device may further include an input sensor configured to detect an input force applied to the button member. The input sensor may be a capacitive sensor.

A portable electronic device may include a housing defining a side surface of the portable electronic device, a display at least partially within the housing, a transparent cover over the display and coupled to the housing, a button member positioned along the side surface and defining a hollow post extending into a hole defined through the housing, a biometric sensing component coupled to the button member, a cap covering the biometric sensing component and secured to the button member, a flexible circuit element extending through the hollow post and electrically coupling the biometric sensing component to a component within the housing, and a potting material at least partially encapsulating the flexible circuit element and the biometric sensing component and at least partially filling the hollow post.

The button member may further define a solid post extending into an additional hole defined through the housing. The portable electronic device may further include a first sealing member positioned between the hollow post and a first surface of the housing that defines the hole, and a second sealing member positioned between the solid post and a second surface of the housing that defines the additional hole. The portable electronic device may further include a sealing material positioned in a gap defined between the cap and the button member. The potting material may abut the sealing material. The biometric sensing component may be a capacitive sensor of a fingerprint sensing system.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
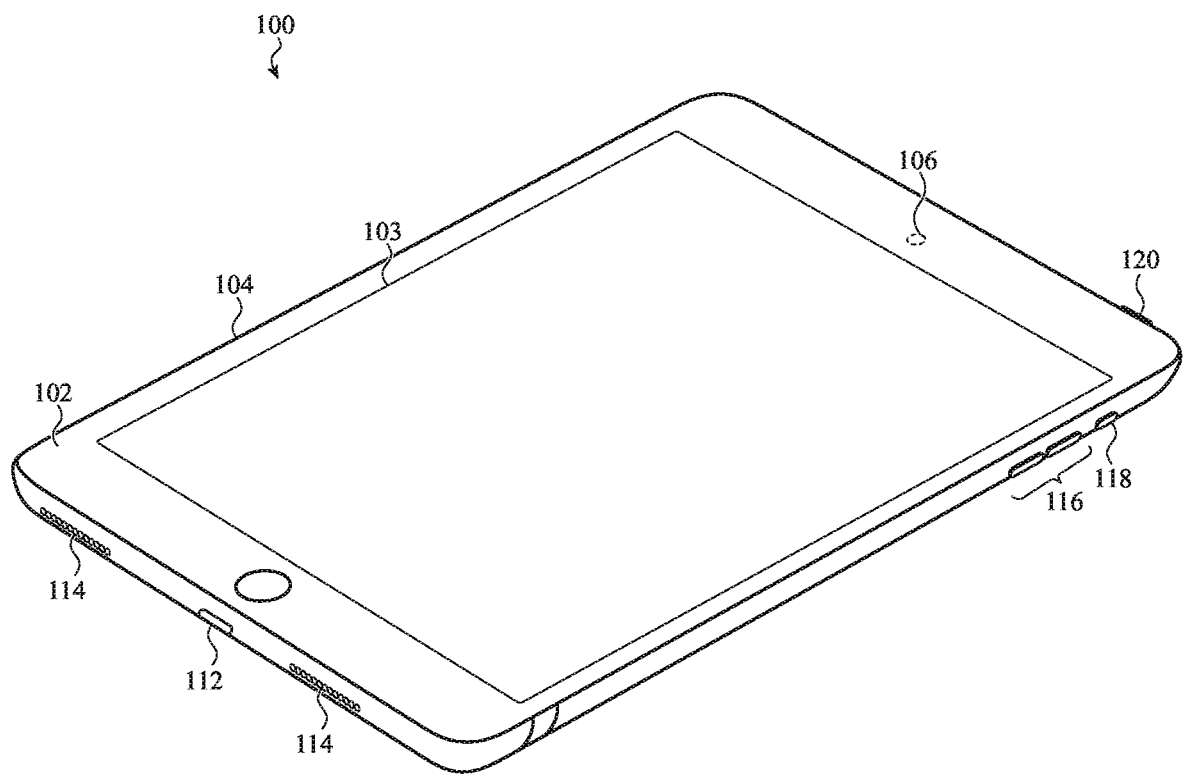
FIGS. 1A-1B depict an example electronic device having a fingerprint-sensing button.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Portable electronic devices as described herein, such as tablet computers, mobile phones, smart watches, and the like, may employ various security measures to ensure that only authorized users can access certain functions and operations of the device. For example, a user may be required to enter a passcode to unlock the device. As another example, a device may include a biometric authentication system that authenticates a user using some biometric information about the user, such as a fingerprint. In some cases, fingerprint sensors may be integrated with input buttons so that the button can provide multiple functions. For example, a user can touch the button to initiate a biometric authentication (e.g., using the user's fingerprint), and can also press the button to provide an input to control a function or operation of the device.

Portable electronic devices may be sealed against ingress of water, sweat, lotions, and other contaminants to increase the durability and functionality of the devices. However, external components and input devices such as buttons, biometric sensors, and the like, may introduce paths for liquids and contaminants to enter into the devices. Accordingly, such components and input devices need to be sealed in order to maintain the overall sealing integrity of the device. In the case of multi-function input devices, such as buttons with structurally integrated fingerprint sensors, the task of sealing the input devices may be more complicated, as both mechanical and electrical systems need to be suitably sealed, and in some cases, must allow movement of the input device.

Described herein are electronic devices (e.g., portable electronic devices) with biometric input systems that facilitate both conventional force-based inputs (e.g., button presses), as well as biometric inputs (e.g., fingerprint sensing), while providing a high degree of sealing against the ingress of water or other liquids or contaminants. For example, a button member may include a chassis or frame on which a fingerprint sensor (or portion thereof) may be mounted. The button member may be configured to operate as a movable input button, and may include a sealing member that seals the mechanical interface between the button member and the device housing to which the button member is attached. Because a fingerprint sensor is attached to the button member, an electrical connection must be made between the fingerprint sensor and components within the device, such as with a flexible circuit element. In order to seal the path through which the flexible circuit element passes into the interior of the device, an additional sealing material may be used. For example, the flexible circuit element may pass through a hollow post of the button member, and the hollow post may be filled with a potting material that encapsulates the flexible circuit element and forms a water-tight seal. Accordingly, the techniques and structures described herein amount to a dual-sealed structure in which both the mechanical interface (between the button and the housing) and the path for the electronic components (e.g., through the button member) are sealed against the ingress of liquids and other contaminants.

FIG. 1A shows an example electronic device 100 embodied as a tablet computer (e.g., an example of a portable electronic device). While the device 100 is a tablet computer, the concepts presented herein may apply to any appropriate electronic device, including wearable devices (e.g., smartwatches), laptop computers, handheld gaming devices, mobile phones (e.g., smartphones), or any other device that incorporates input devices (e.g., buttons) and biometric input systems (e.g., fingerprint sensors). Accordingly, any reference to an "electronic device" encompasses any and all of the foregoing.

The electronic device 100 includes a cover 102 (e.g., a front cover), such as a glass, plastic, or other substantially transparent material, component, or assembly, attached to a housing 104. The cover 102, which may be referred to as a transparent cover 102, may be positioned over a display 103. The cover 102 may be formed from glass (e.g., a chemically strengthened glass), sapphire, ceramic, glass-ceramic, plastic, or another suitable material. The housing 104 may include one or more metal members coupled together with polymer (or other dielectric) materials. In some cases, the housing 104 is a single piece of metal, a single piece of polymer, or it may use other materials and/or constructions. The housing 104 (and/or housing members of the housing) may define one or more side surfaces of the device 100, which may define exterior side surfaces of the device 100.

The device 100 may also include buttons, switches, and other types of physical input devices. For example, the device 100 may include buttons 116, switches 118, a fingerprint-sensing button 120 (or other type of biometric-sensing button), and/or other physical input systems. Such input systems may be used to control various operations and functions of the device 100. For example, the buttons 116 may be operative to change speaker volume, and the switch 118 may be operative to switch between "ring" and "silent" modes. The fingerprint-sensing button 120 may include a fingerprint sensor or components thereof. The fingerprint sensor may be configured to capture an image or other representative data of a finger that is in contact with the fingerprint-sensing button 120. The device may verify that a user is an authorized user by comparing a captured image (or other representative data) of a finger that is in contact with the fingerprint-sensing button 120 with stored images (or other representative data) of authorized users. An image of a fingerprint, as captured by a capacitive fingerprint sensor, for example, may be understood as a multi-dimensional array that corresponds to the sensor's electrical response to a user's finger. It is not necessary that the image be capable of depicting a visual representation of the user's finger or fingerprint.

Figure 1B:
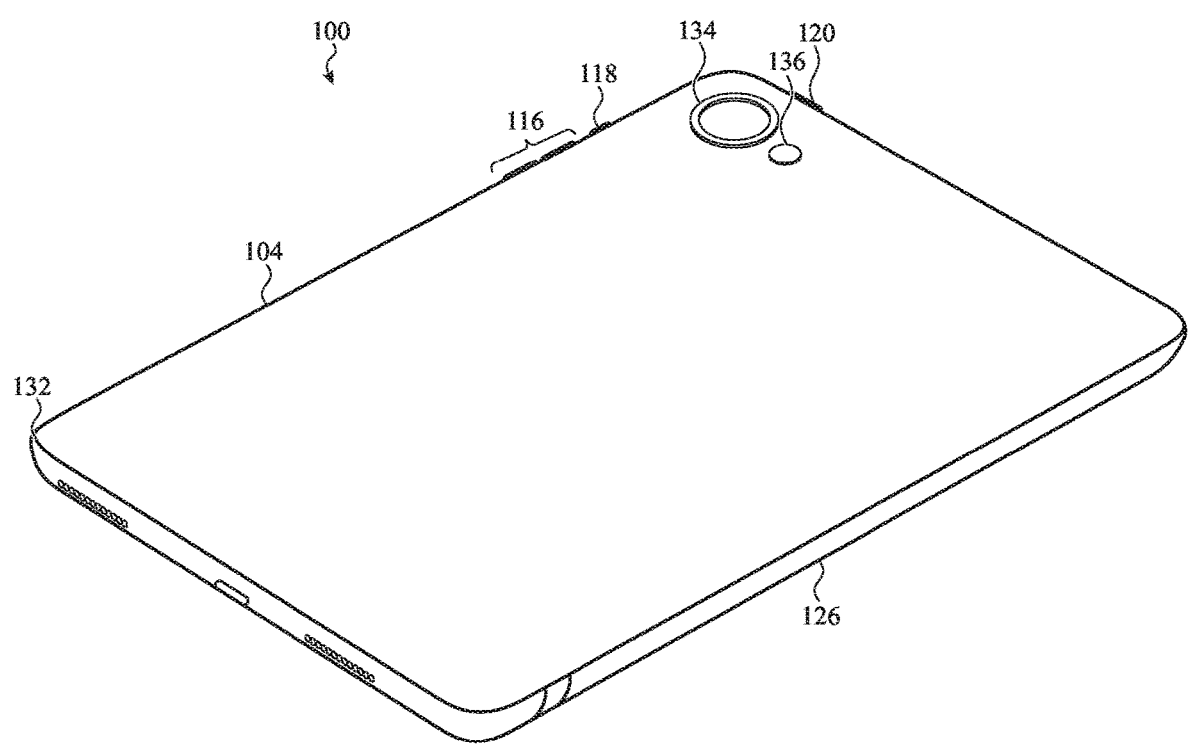

While FIGS. 1A-1B, and the application more generally, describe an example fingerprint-sensing button 120, it will be understood that a fingerprint sensor (or other biometric sensor) may be integrated with other buttons or input devices. Further, the fingerprint-sensing button 120 may perform any suitable function when actuated, such as controlling a power state of the device, changing a volume, activating or deactivating a display, or the like.

The display 103 may be at least partially positioned within the interior volume defined by the housing 104. The display 103 may be coupled to the transparent cover 102, such as via an adhesive or other coupling scheme. In some cases, the assembly that includes the display 103 and the transparent cover 102 may be referred to as a top module. The top module may also include other components, such as touch- and/or force-sensing components, structural members, cameras, biometric sensors (e.g., facial recognition systems), ambient light sensors, or the like.

The display 103, which may also be referred to herein as a display stack, may include a liquid-crystal display (LCD), light-emitting diode display, organic light-emitting diode (OLED) display, an active layer organic light emitting diode (AMOLED) display, organic electroluminescent (EL) display, electrophoretic ink display, or the like. The display 103 may be configured to display graphical outputs, such as graphical user interfaces, that the user may view and interact with. The device 100 may also include an ambient light sensor that can determine properties of the ambient light conditions surrounding the device 100. The device 100 may use information from the ambient light sensor to change, modify, adjust, or otherwise control the display 103 (e.g., by changing a hue, brightness, saturation, or other optical aspect of the display based on information from the ambient light sensor).

The display 103 may include or be associated with one or more touch- and/or force-sensing systems. In some cases, components of the touch- and/or force-sensing systems are integrated with the display stack. For example, electrode layers of a touch- and/or force-sensor may be provided in a stack that includes display components (and is optionally attached to or at least viewable through the cover 102).

The touch- and/or force-sensing systems may use any suitable type of sensing technology, including capacitive sensors, resistive sensors, surface acoustic wave sensors, piezoelectric sensors, resistive sensors, or the like. The outer or exterior surface of the cover 102 may define an input surface (e.g., a touch- and/or force-sensitive input surface) of the device. While both touch- and force-sensing systems may be included, in some cases the device 100 includes a touch-sensing system and does not include a force-sensing system.

The device 100 may also include a front-facing camera 106. The front-facing camera 106 may be positioned below or otherwise covered and/or protected by the cover 102.

The device 100 may also include a speaker outlet 110 to provide audio output to a user, such as to a user's ear during voice calls. The device 100 may also include a charging port 112 (e.g., for receiving a power cable for providing power to the device 100 and charging the battery of the device 100). The device 100 may also include loudspeaker openings 114. The loudspeaker openings 114 may allow sound output from an internal speaker system to exit the housing 104. The device 100 may also include one or more microphones. In some cases, a microphone within the housing 104 may be acoustically coupled to the surrounding environment through a loudspeaker opening 114.

FIG. 1B illustrates a back side of the device 100. The device 100 may include a back cover 132 coupled to the housing 104. The back cover 132 may include a substrate formed of glass, though other suitable materials may alternatively be used (e.g., plastic, sapphire, ceramic, ceramic glass, etc.). The back cover 132 may define a back exterior surface of the device 100. The back cover 132 may include one or more decorative layers on the exterior or interior surface of the substrate. For example, one or more opaque layers may be applied to the interior surface of the substrate (or otherwise positioned along the interior surface of the substrate) to provide a particular appearance to the back side of the device 100. The opaque layer(s) may include a sheet, ink, dye, or combinations of these (or other) layers, materials, or the like. In some cases the opaque layer(s) have a color that substantially matches a color of the housing 104 (e.g., the exterior surfaces of the housing members and the joint structures).

In some cases, the housing 104 may define a back wall of the device 100. For example, a single component or assembly may define the side surfaces and the back wall (and thus the back surface) of the device 100. In some cases, a back cover 132 may be attached to a back wall of a housing 104, such that the back cover 132, and not the back wall of the housing 104, defines the back surface of the device 100.

The device 100 may include a wireless charging system, whereby the device 100 can be powered and/or its battery recharged by an inductive (or other electromagnetic) coupling between a charger and a wireless charging system within the device 100. In such cases, the back cover 132 may be formed of a material that allows and/or facilitates the wireless coupling between the charger and the wireless charging system (e.g., glass).

The device 100 may also include a rear-facing camera 134 and a flash 136 that is configured to illuminate a scene to facilitate capturing images with the camera 134. The flash 136 is configured to illuminate a scene to facilitate capturing images with the camera 134. The flash 136 may include one or more light sources, such as one or more light emitting diodes (e.g., 1, 2, 3, 4, or more LEDs).

Figure 2A:
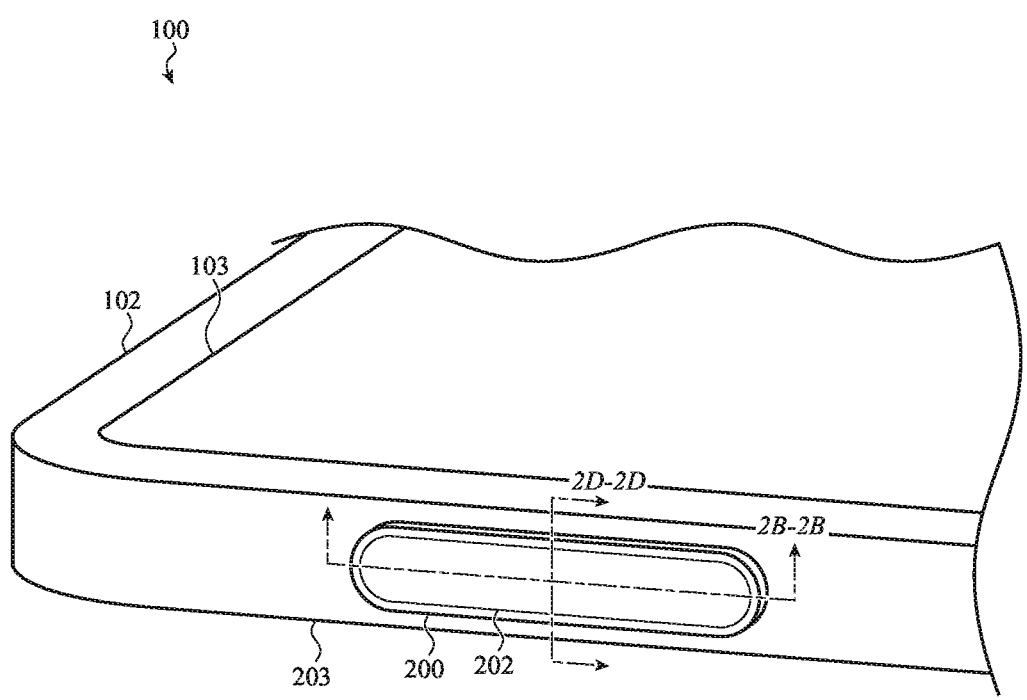
FIG. 2A depicts a side view of the electronic device of FIGS. 1A-1B.

FIG. 2A a side view of the device 100, showing additional details of the fingerprint-sensing button 120 positioned along a side surface of a housing member 203 of the device 100. (The housing member 203 may be a component of the housing 104 and may define a side surface of the housing 104 and/or the device 100.) For example, the fingerprint-sensing button 120 may include a button member 200, and a cap 202 that is attached to the button member 200. The button member 200 may act as a structural component of the fingerprint-sensing button 120 to which other components are coupled (e.g., biometric sensing components, the cap 202, circuit boards, etc.).

The cap 202 may cover a fingerprint-sensing component 204 (FIG. 2B) and may define an input surface of the fingerprint-sensing button 120. A user may touch the input surface so that his or her fingerprint can be imaged by the fingerprint sensor for user authentication. When the fingerprint-sensing button 120 is being operated as a conventional button, the user may also contact the input surface to provide the requisite input or actuation force to the fingerprint-sensing button 120. The cap 202 may be formed from sapphire, glass, ceramic, glass ceramic, plastic, or another suitable material. The cap 202 may be a single piece of material or multiple components assembled together. The cap 202 may be formed of a material or materials that permit biometric sensing therethrough. For example, if the fingerprint sensor of the fingerprint-sensing button 120 uses capacitive sensing, the cap 202 may be a dielectric material (e.g., glass, sapphire). The cap 202 may have a thickness between about 100 to about 200 microns. In some cases, the cap 202 may include one or more layers of ink, dye, coatings, films, or other materials. Such layers may be used to provide optical masking, cosmetic coloring, shielding, or the like. The thickness of the cap 202 with the one or more layers of material may be between about 200 and about 300 microns thick.

Figure 2B:
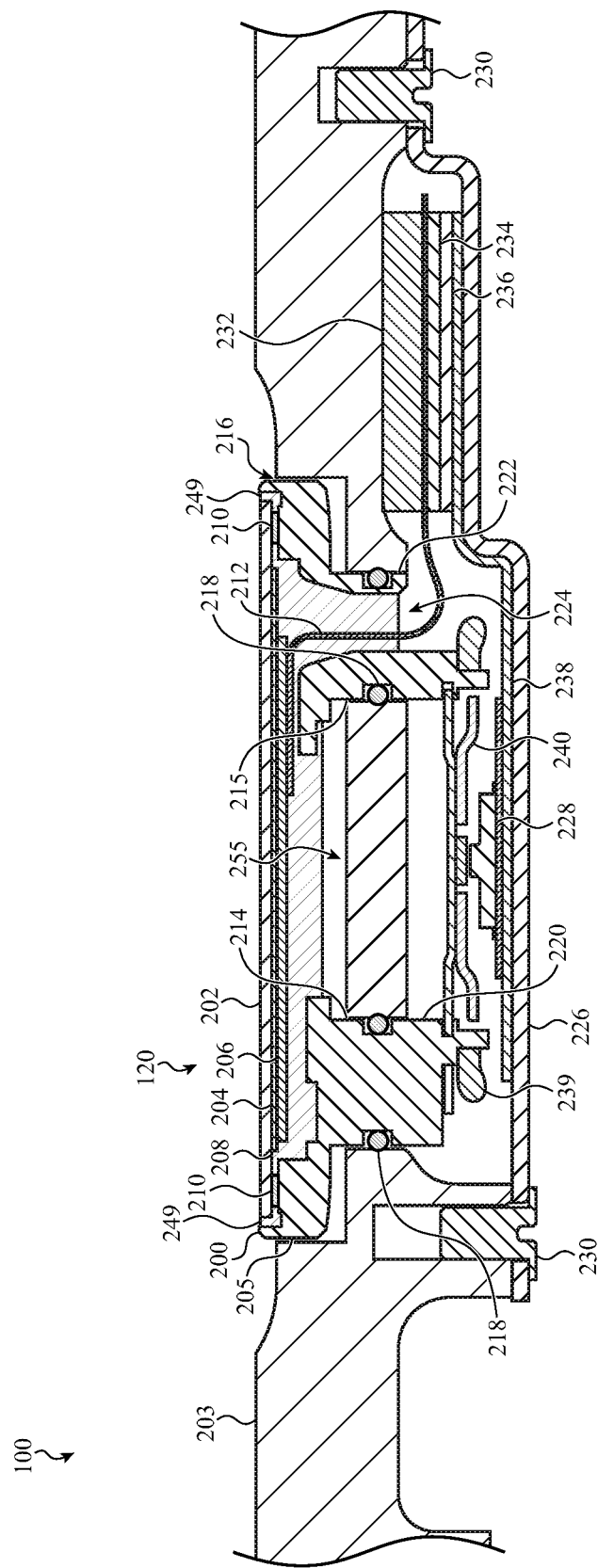
FIG. 2B depicts a partial cross-sectional view of the electronic device of FIGS. 1A-1B.
Figure 2C:
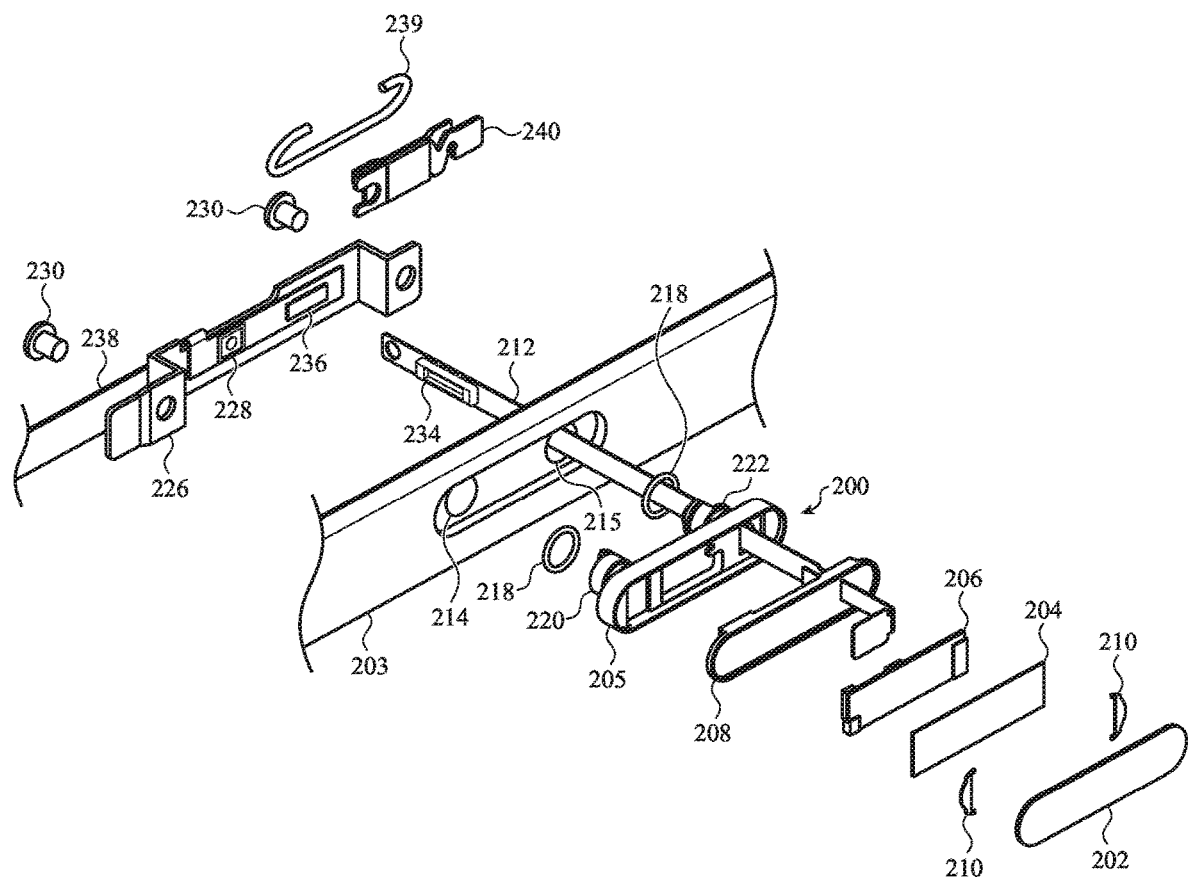
FIG. 2C depicts a partial exploded view of the electronic device of FIGS. 1A-1B.

FIG. 2B is a partial cross-sectional view of the device 100, viewed along line 2B-2B in FIG. 2A, illustrating an example arrangement of the fingerprint-sensing button 120 and associated components. FIG. 2C is a partial exploded view of the portion of the device 100 that includes the fingerprint-sensing button 120. The fingerprint-sensing button 120 includes a button member 200 that defines a chassis portion 205 and posts 220, 222. The chassis portion 205 and the posts 220, 222 may be a monolithic structure (e.g., a single piece of material, such as a die-cast, molded, or machined component), or it may be an assembly that includes multiple separate parts secured together. The button member 200 may be formed from aluminum, stainless steel, titanium, ceramic, an amorphous metal, a polymer, or any other suitable material(s).

A biometric sensing component may be coupled to the chassis portion 205 such that the biometric sensing component can sense, detect, or otherwise receive a biometric input from a user. As shown and described herein, the biometric sensor of the device 100 is a fingerprint sensor, and the biometric sensing component is a component of a fingerprint sensing system. More particularly, FIG. 2B shows a fingerprint sensing component 204. The fingerprint sensing component 204 may be a capacitive sense layer that is configured to capture an image of a fingerprint of a user to authenticate the user. For example, the capacitive sense layer, along with other components of a fingerprint sensing system, may detect physical characteristics of a user's fingerprint, such as the ridges and valleys and/or other patterns of a fingerprint. Upon authentication (and optionally additionally in response to detecting a press or force or other actuation of the fingerprint-sensing button 120), the device may take an action such as unlocking the device, initiating a payment, activating a display of the device, opening or launching an application, or the like.

The fingerprint sensing component 204 may be coupled to a substrate 206, such as a circuit board, and a flexible circuit element 212 may be conductively coupled to the fingerprint sensing component 204 (optionally via conductors of the circuit board). The flexible circuit element 212 may conductively couple the fingerprint sensing component 204 (or other biometric sensing component) to a component within the housing of the device. For example, the flexible circuit element 212 may conductively couple to a flexible circuit element 238 (e.g., a flexible printed circuit or the like) via a set of interfacing connectors 234, 236. The flexible circuit element 238 may, in turn, conductively couple to a processor or other component within the device 100. Information from the fingerprint sensing component 204 may thus be provided to the processor or other component to facilitate fingerprint sensing, biometric authentication, or the like. The flexible circuit element 212 may be attached to an inner surface of the housing member 203 via an adhesive layer 232, such as an adhesive foam that secures the flexible circuit element 212 in place and provides a biasing force to maintain the connection between the interfacing connectors 234, 236. As used herein, a flexible circuit element may include a flexible substrate, such as a polymer film, with conductive traces formed of metals or other conductive materials on or otherwise integrated with the flexible substrate.

As noted above, the fingerprint-sensing button 120 may include a cap 202, such as a sapphire cap. The cap 202 may be attached to the chassis portion 205 of the button member 200 via an adhesive 210. The adhesive 210 may be a heat-activated adhesive, such as a heat-activated film, or any other suitable adhesive (e.g., a pressure-sensitive adhesive, an epoxy, etc.). The adhesive 210 may retain the cap 202 in place and securely attached to the chassis portion 205. As described herein with respect to FIG. 2D, a sealing material, such as a curable liquid, may be introduced into a gap or space between the cap 202 and the chassis portion 205. The sealing material may help prevent liquids or other materials, such as water, sweat, lotions, sunscreen, or the like, from getting into the space between the cap 202 and the chassis portion 205, which may help improve the integrity and reliability of the fingerprint sensing component 204.

The posts 220, 222 may extend into (e.g., through) holes 214, 215 that extend through the housing member 203. Side walls of the holes 214, 215 (e.g., the shaft of the hole) may be defined by surfaces of the housing member 203. A plate 240 may be attached to the posts 220, 222 inside the housing 104. The plate 240 may serve several functions. For example, the plate 240 may retain the button member 200 to the housing 104 (e.g., by preventing the button member 200 from being removed along a vertical direction, as shown in FIG. 2B). The plate 240 may also interact with an input sensor 228. For example, when the button 120 is pressed by a user, the plate 240 may impart a force onto the input sensor 228. The device 100 can detect the force and take an appropriate action in response to detecting the force. The input sensor 228 may be a switch (e.g., a dome switch), a force sensor or component of a force sensor (e.g., a strain gauge, a piezoelectric or piezoresistive material, a capacitive force sensor, or the like). In some cases, the input sensor 228 imparts a biasing force to the button member 200 to force the button member 200 outwards and in an undepressed configuration.

The input sensor 228 may be conductively coupled to the flexible circuit element 238, which may be mounted to or otherwise in contact with a bracket 226. The bracket 226 may be secured to the housing member 203 via fasteners 230, or otherwise secured to the housing 104 and/or device 100. The flexible circuit element 238 may conductively couple both the input sensor 228 and the fingerprint sensing component 204 (via the flexible circuit element 212) to other components within the device, such as a processor or other circuitry.

An anti-roll bar 239 may also be attached to the posts 220, 222. The anti-roll bar 239, discussed in greater detail with respect to FIG. 2E, may help maintain the alignment of the button member 200 when the button 120 is pressed (e.g., maintain uniform travel of both posts). For example, a force that is applied to the button 120 that is not directly centered on the cap 202 may tend to cause the button member 200 to rock, twist, or otherwise bind in the holes 214, 215. The anti-roll bar 239 may help evenly distribute the forces between the posts 220, 222 so that even an offset force on the button member 200 results in the posts 220, 222 moving in unison and the input surface of the button (e.g., the cap 202) remaining perpendicular to the input force as it is being pressed and/or translated.

As noted above, in order to provide a durable device that can stand up to exposure to liquids, and optionally even full submersion, buttons and other input devices need to be well-sealed against the ingress of water and other liquids and contaminants. In the case of the fingerprint-sensing button 120, the sealing may be more involved than for conventional buttons. For example, in addition to having to waterproof the mechanical interface between the button member 200 and the housing, the path of the flexible circuit element that connects to the fingerprint sensing component 204 must also be waterproofed. In order to achieve these goals, a variety of waterproof seals are employed. For example, in order to form a waterproof seal at the interface between the button member 200 and the housing 104, sealing members 218 may be positioned around the posts 220, 222 and in contact with the posts 220, 222 and the side walls of the holes 214, 215. In some cases, the sealing members 218 are O-rings formed of an elastomeric material (e.g., rubber), which may be retained in channels or grooves formed in the posts 220, 222 (as shown), or they may be retained in channels or grooves formed in the side walls of the holes 214, 215. Other sealing members may be used instead of or in addition to the O-rings, such as insert-molded polymer seals, wipers, bushings, or the like.

As used herein, a waterproof seal may refer to a seal (which may be formed by one or more components or structures) that is configured to inhibit ingress of liquid. In some cases, a waterproof seal may achieve an ingress protection rating, such as at least IP61, IP62, IP63, IP64, IP65, IP66, IP67, IP68, or IP69, as defined by IEC 60529.

While the holes 214, 215 through the housing member 203 allow physical access through the housing so that the button member can actuate an input sensor, access into the housing must also be provided so that the fingerprint sensing component, which by necessity must be externally accessible by a user, can be conductively coupled to components within the housing 104. In order to leverage the waterproof seal that is already present between the posts 220, 222 and the side walls of the holes 214, 215, access for the fingerprint sensing component 204 may be provided through a hollow post. For example, as shown in FIG. 2B, the post 222 may be a hollow post that defines a passage that extends from an opening in the chassis portion 205 (e.g., where the fingerprint sensing component 204 is located) to an opening 224 that is past the sealing member 218 and communicates with the internal volume of the device 100. The flexible circuit element 212 may extend through the hollow post 222 to conductively couple the fingerprint sensing component 204 to the flexible circuit element 238 (or any other suitable component, circuit board, conductive connector, or the like).

While routing the flexible circuit element 238 through the hollow post 222 avoids the necessity of forming another hole through the housing member 203, it still affords another possible access path for liquids. Accordingly, a second waterproof seal may be formed within the hollow post 222. For example, a potting material 208 may be positioned in the hollow post 222 to at least partially encapsulate the flexible circuit element 238 and to form a waterproof seal within the hollow post 222. The potting material 208 may fill spaces and gaps in the fingerprint-sensing button 120 more generally. For example, the potting material 208 may contact and/or at least partially encapsulate the fingerprint sensing component 204, the substrate 206, the back of the cap 202, or the like. The potting material 208 may thus fill substantially all of the voids defined between the button member 200 and the components that are coupled to the button member 200 (e.g., the cap 202, the fingerprint sensing component 204, etc.), thereby preventing ingress of liquid into the device through the hollow post 222 (and through the button member 200 more generally). Because the potting material 208 extends around the fingerprint sensing component 204 and other components, it effectively prevents liquids or other contaminants from contacting and potentially damaging those components as well.

The potting material 208 may be positioned in the hollow post 222, and in the voids between the button member 200 and the other components, by flowing a liquid or otherwise flowable material into place, and then allowing the liquid or flowable material to cure or otherwise harden. The potting material 208 may be an epoxy, glue, polymer, or another suitable material. The potting material 208 may be introduced in various ways and via various entry points. For example, the potting material 208 may be flowed, injected, or otherwise introduced through a hole 255 defined through the chassis portion 205 of the button member 200. Instead of or in addition to flowing through the hole 255, the potting material 208 may be flowed, injected, or otherwise introduced through the hollow post 222. Other introduction points are also contemplated (e.g., a second hollow post, an injection port formed through the chassis portion 205, etc.). Regardless of the introduction and/or flow path, the potting material 208 may flow into the hollow post 222, into the voids defined between the button member 200 and the components that are coupled to the button member 200, and onto the fingerprint sensing component 204 and/or substrate 206 (e.g., to at least partially encapsulate the fingerprint sensing component 204 and/or substrate 206).

As shown in FIG. 2B, the post 220 may be a solid post. In some cases, however, the post 220 may also be a second hollow post. The second hollow post may be used to reduce the weight of the device and may also be used to facilitate the introduction of potting material. For example, the second hollow post may allow air to vent out of the volume where the potting material 208 is being introduced. In some cases, suction may be applied to the second hollow post to help cause the potting material 208 to flow into and fill the target volume.

As noted above, FIG. 2C is a partial exploded view of the portion of the device 100 that includes the fingerprint-sensing button 120 and shows additional details of the components shown and described with respect to FIG. 2B.

As shown in FIG. 2C, the adhesive 210 may include two discrete adhesive layers positioned at the longitudinal ends of the cap 202. In some cases, the potting material 208 may work in conjunction with the adhesive 210 to secure the cap 202 (as well as the fingerprint sensing component 204 and substrate 206 which may be secured to the cap 202 prior to assembly of the cap 202 to the button member 200) to the button member 200. For example, the potting material 208 may bond to and/or mechanically engage features of the substrate 206, fingerprint sensing component 204, and the cap 202, as well as bonding to and/or mechanically engaging features of the button member 200. The bonding and/or mechanical engagement (e.g., mechanical interlocks) provided by the potting material 208 may help retain the cap 202, fingerprint sensing component 204, and substrate 206 to the button member 200. As shown in FIG. 2C, the potting material 208 is in a cured or hardened condition, though it will be understood that this is for illustrative purposes, and that the potting material 208 is not installed or assembled in a cured or hardened state, but rather is flowed into place and allowed to cure after the cap 202 is attached to the button member 200 (e.g., via the adhesive 210).

During assembly, the components shown to the right of the housing member 203 in FIG. 2C (including the flexible circuit element 212 and connector 234) may be assembled together to form a button subassembly, which may thereafter be assembled with the device 100. For example, the flexible circuit element 212 may be threaded through the hole 215 in the housing member 203, and the posts 220, 222 of the button member 200 maybe inserted into the holes 214, 215 in the housing member 203. Thereafter, the plate 240 and the anti-roll bar 239 may be attached to the button member 200, and the remaining components may be assembled to complete this portion of the device.

Figure 2D:
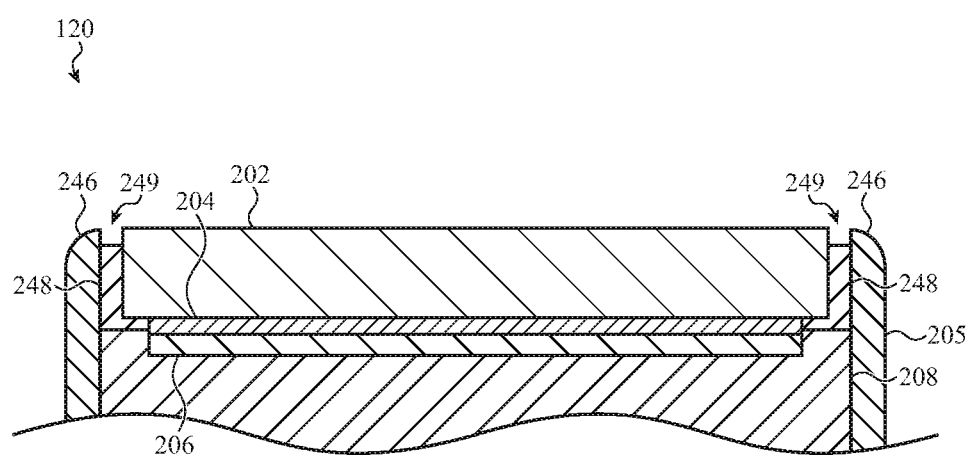
FIG. 2D depicts a partial cross-sectional view of a portion of a fingerprint-sensing button.

FIG. 2D is a partial cross-sectional view of the fingerprint-sensing button 120, viewed along line 2D-2D in FIG. 2A. FIG. 2D illustrates an example arrangement of the components and materials in the chassis portion 205 of the button member 200 and shows a sealing material 248 that may be introduced between portions of the cap 202 and the chassis 205. For example, the cap 202 may be fit into the chassis 205 with a tight tolerance, such that a gap 249 between the side surfaces of the cap 202 and the inner surfaces of the chassis 205 are small (e.g., between about 10 and about 100 microns, between about 15 and about 30 microns, or the like). In such cases, a potting material may not be able to fill the gap 249. For example, the viscosity of the potting material 208 in its liquid form may be too high to effectively fill the gap 249.

Accordingly, a sealing material 248 may be introduced into the gap 249 to help fill and seal the gap 249. The sealing material 248 may be introduced into the gap 249 as a liquid, where the liquid has a viscosity that allows the liquid to at least partially fill the gap 249. The viscosity of the liquid may be lower than that of the liquid state of the potting material 208. The sealing material 248 may then be allowed to cure or otherwise harden in place, thereby filling the gap 249 so that liquids or other contaminants cannot enter into the button member through the gap 249. Accordingly, the sealing material 248 may define a third waterproof seal, in addition to those defined by the sealing members 218 and the potting material 208, between the cap 202 and the chassis 205. After the sealing material 248 is introduced into the gap 249, the potting material 208 may be flowed into place. The potting material 208 may abut the sealing material, forming intimate contact with the sealing material 248, thereby further enhancing the waterproof seals provided by the potting material 208 and the sealing material 248.

The sealing material 248 may be introduced into the gap 249 by flowing a liquid or otherwise flowable material into place, and then allowing the liquid or flowable material to cure or otherwise harden. The sealing material 248 may be introduced in various ways and via various entry points. For example, the sealing material 248 may be flowed, injected, or otherwise introduced through the hole 255 defined through the chassis portion 205 of the button member 200, and/or the sealing material 248 may be flowed, injected, or otherwise introduced through the hollow post 222. As another example, the sealing material 248 may be flowed, injected, or otherwise introduced directly into the gap 249 from the exterior side of the button member. Other introduction points are also contemplated (e.g., a second hollow post, an injection port formed through the chassis portion 205, etc.). Regardless of the introduction and/or flow path, the sealing material 248 may flow into the gap 249, as shown in the figures.

The sealing material 248 may perform several functions. For example, it acts as a barrier so that liquids such as water, sweat, lotion, sunscreen, and the like cannot enter into the gap 249 where it could potentially become trapped, travel further into the button member, or damage components in the button member (e.g., the fingerprint sensing component 204 or other electrical or conductive components). Additionally, the sealing material 248 helps ensure that the conductive properties of the materials near the fingerprint sensing component 204 remain relatively constant and are not affected by different liquids or other materials being introduced into the gap 249. For example, without the sealing material 248, water or another liquid may enter into the gap 249 during use of the device, which may affect capacitive coupling between the fingerprint sensing component 204 and the chassis 205 (which may be formed of a metal such as aluminum, stainless steel, or the like). The change in capacitive coupling between these components may negatively affect the operation of the fingerprint sensing component 204. Accordingly, filling or substantially filling the gap 249 with the sealing material 248 may help improve the integrity and reliability of the fingerprint sensing functions.

In some cases, the sealing material 248 completely fills the gap 249 such that the top surface 246 of the chassis, the top surface of the sealing material 248, and the top surface of the cap 202 (as oriented in FIG. 2D) are all flush with one another (e.g., to within a threshold such as about 100 microns, about 50 microns, about 25 microns, or the like). In some cases, the top surface of the sealing material 248 is recessed relative to the top surface 246 of the chassis and the top surface of the cap 202. Where the top surface of the sealing material 248 is recessed, the top surface of the sealing material 248 may be recessed from the top surface of the cap 202 by less than about 5%, less than about 10%, less than about 15%, or less than about 20% of the thickness of the cap 202. In some cases, the top surface of the sealing material 248 is recessed from the top surface of the cap 202 by between about 20 and about 30 microns.

As shown in FIG. 2D, the top surface 246 of the chassis and the top surface of the cap 202 may be flush (e.g., to within a threshold such as about 100 microns, about 50 microns, about 25 microns, or the like). In some cases, the top surface 246 of the chassis and the top surface of the cap 202 may be offset from one another, with either the top surface 246 of the chassis or the top surface of the cap 202 proud of the other.

In some cases, the chassis 205 is configured to operate as a connection between a user's finger (when the finger is in contact with the fingerprint-sensing button 120) and an electrical ground of the device 100. In some cases, the ground connection between the user's finger and the chassis 205 (and the grounding of the chassis 205 more generally) helps electrically shield the fingerprint sensing component 204, improves signal-to-noise ratio of the fingerprint sensing component 204, and generally improves the operation of the fingerprint sensing component 204 and its ability to capture an image or other data from the user's finger. To facilitate the electrical grounding, the chassis 205 (and indeed the whole button member 200) may be conductively coupled to an electrical ground of the device 100. For example, the ground path may be defined by a solder joint between the chassis 205 and the flexible circuit element 212, which is conductively coupled to other components within the device 100 (e.g., the flexible circuit element 212 conductively couples the chassis 205 to the electrical ground of the device 100).

Figure 2E:
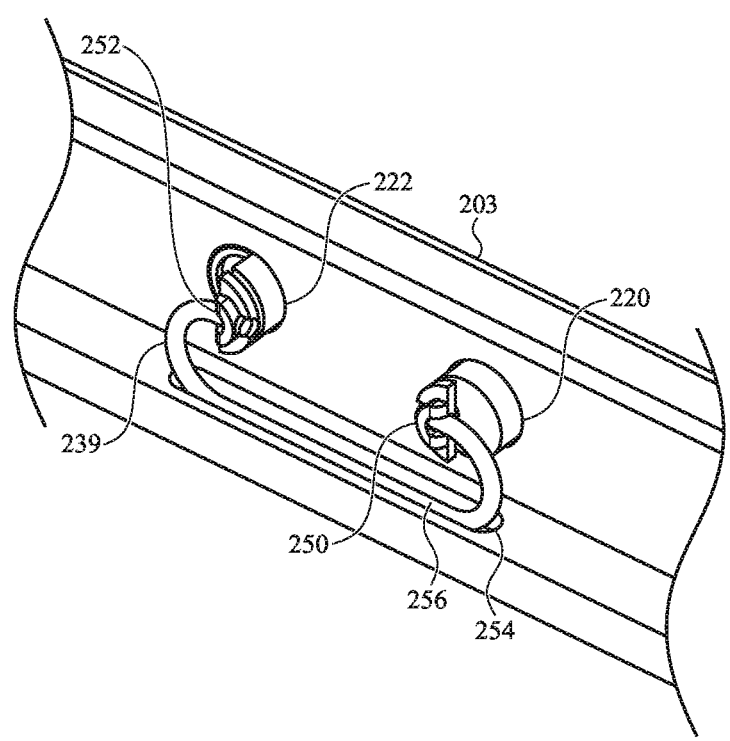
FIG. 2E depicts a portion of an interior of the electronic device of FIGS. 1A-1B.

As noted above, the fingerprint-sensing button 120 may include an anti-roll bar 239. FIG. 2E illustrates a simplified view of an internal portion of the device 100, illustrating an example configuration of the anti-roll bar 239 and its integration with the housing structure and the button components. For example, the anti-roll bar 239 may be retained to the housing 104 by positioning a shaft 256 of the anti-roll bar 239 in a recess 254 or other feature formed in the housing member 203. Ends of the anti-roll bar 239 may be coupled to the posts 220, 222, such as via connection features 250, 252, respectively. The connection features 250, 252 may be holes into which the ends of the anti-roll bar 239 extend, or they may be any other suitable feature or mechanism (e.g., a clip, socket, etc.).

The shaft 256 may be allowed to rotate within the recess 254, but translation of the shaft (at least along the actuation direction of the fingerprint-sensing button) may be limited or constrained. Thus, when the button is pressed, the posts 220, 222 move inwards along an actuation direction, causing the anti-roll bar 239 to pivot or rotate within the recess 254. In this way, binding or twisting of the fingerprint-sensing button 120 due to off-center applications of force to the button may be reduced or eliminated. For example, any inward motion of one of the posts 220, 222 essentially causes the other post to be pulled inward by substantially the same amount, even if no force or less force is being applied directly over the other post.

While FIG. 2E shows the anti-roll bar 239 retained to the housing via the shaft 256 being positioned in the recess 254, this is merely one example configuration. In some cases, instead of or in addition to a recess, the anti-roll bar 239 may be retained to the housing via clips, brackets, fasteners, and/or the like.

Figure 3A:
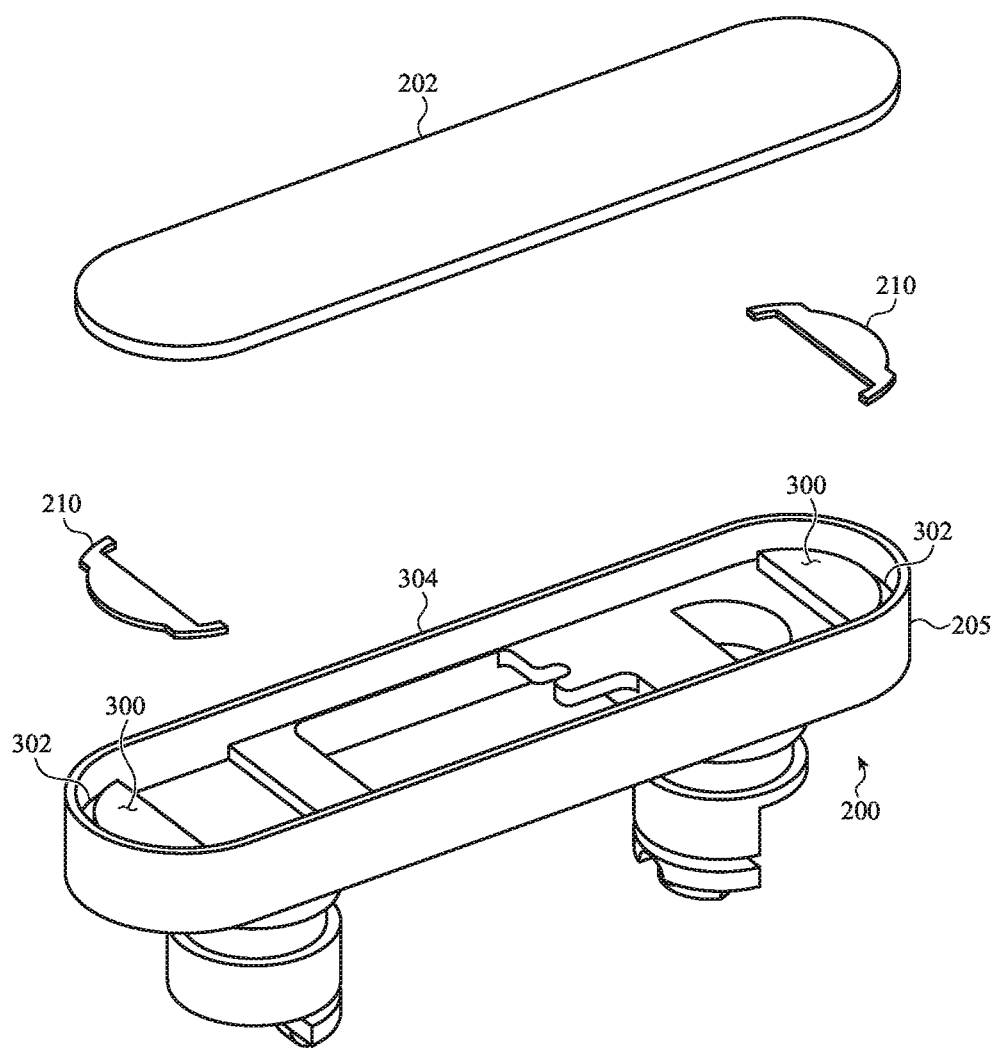
FIG. 3A depicts a partial exploded view of the fingerprint-sensing button.

FIG. 3A is a partial exploded view of a portion of the fingerprint-sensing button 120. For example, FIG. 3A illustrates the button member 200 with the cap 202 and the adhesive 210 removed. The adhesive 210 may be positioned on coupling surfaces 300 of the button member 200 to secure the cap 202 to the button member 200.

The button member 200 may also define channels 302 between the button coupling surfaces 300 and a rim 304 of the button member 200. The channels 302 may be configured to allow a sealing material, such as the sealing material 248, to flow into the space between the cap 202 and the interior surfaces of the chassis 205 and into the gap 249 (FIG. 2D), without being blocked by the adhesive 210. In some cases, the channels 302 and the bottom surface of the cap 202 may define a capillary channel that draws the sealing material through the channel and towards or into the gap 249 so that the sealing material 248 reaches its target locations and substantially or completely fills the gap 249.

Figure 3B:
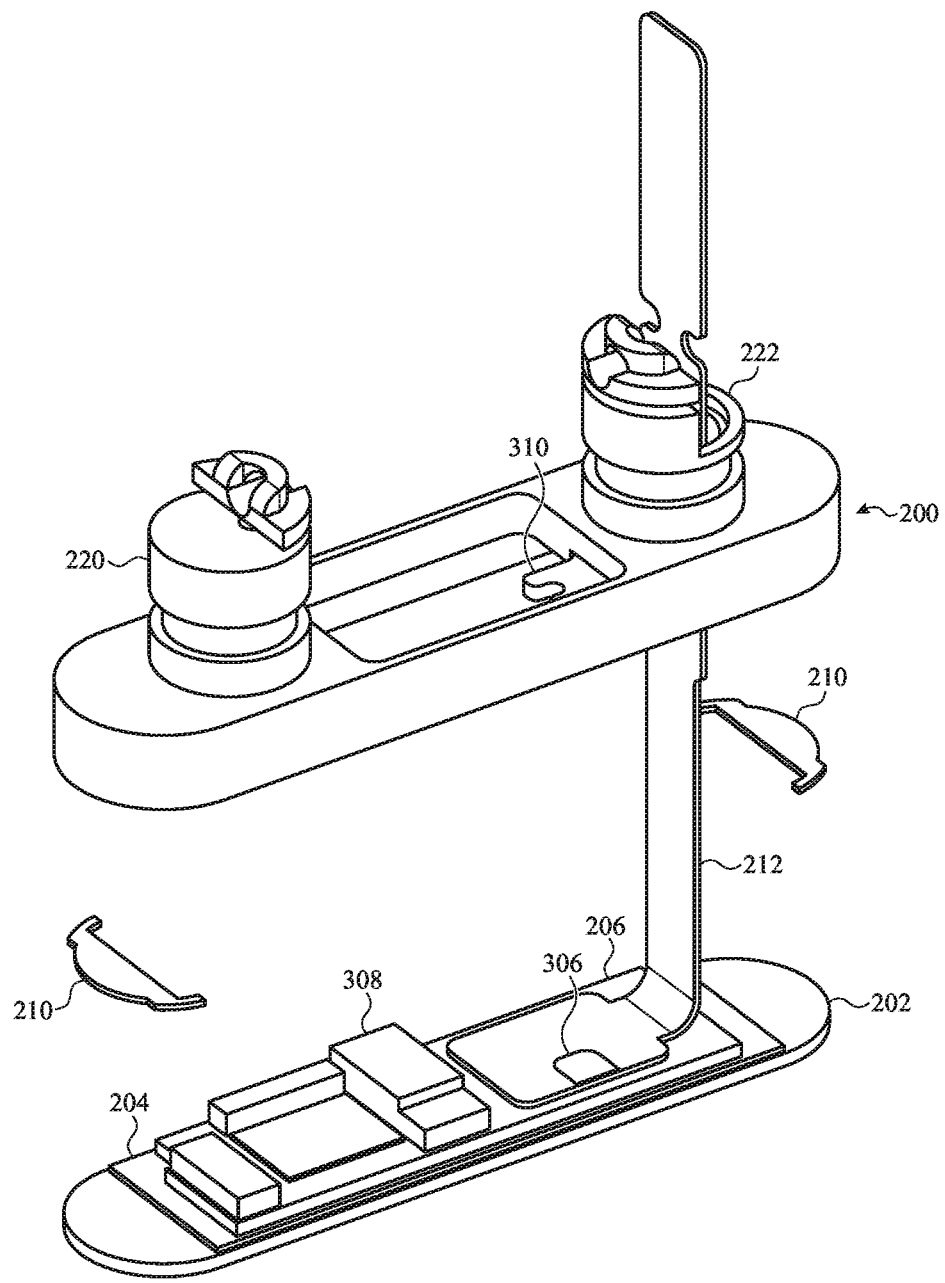
FIG. 3B depicts another partial exploded view of the fingerprint-sensing button.

FIG. 3B is a partial exploded view of a portion of the fingerprint-sensing button 120, showing an underside view of the fingerprint-sensing button 120. FIG. 3B shows the fingerprint sensing component 204 and substrate 206 coupled to the cap 202, and the flexible circuit element 212 coupled to the substrate 206. FIG. 3B may also represent a stage of the assembly process for the fingerprint-sensing button 120, when a cap subassembly (e.g., the assembled cap 202, fingerprint sensing component 204, substrate 206, and flexible circuit element 212) is being attached to the button member 200. In particular, the flexible circuit element 212 is being extended through the hollow post 222, and the adhesive 210 is being positioned between the cap 202 and the button member 200.

As shown in FIG. 3B, the substrate 206, which may be a circuit board, may include circuit components 308. Such components may be coated and/or encapsulated prior to the cap subassembly being attached to the button member 200. The coating and/or encapsulation material may help seal and protect the circuit components 308 from liquids or other contaminants, as well protect the circuit components 308 from being directly contacted by the potting material.

FIG. 3B also illustrates a grounding feature 310 of the button member 200. The grounding feature 310 may be a tab, protrusion, or any other suitable feature that may be soldered (or otherwise conductively coupled) to a conductive pad 306 (e.g., a solder pad) on the flexible circuit element 212. As noted above, the flexible circuit element 212 may conductively couple the button member 200 to an electrical ground of the device 100.

Figure 3C:
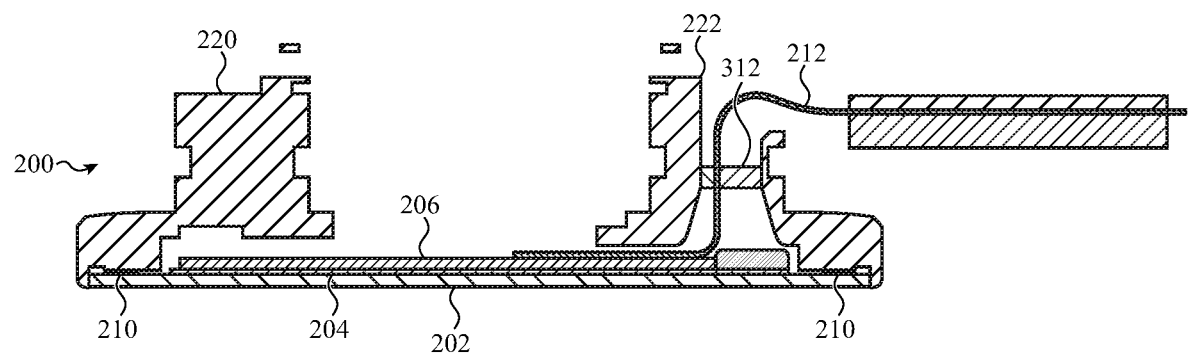
FIG. 3C depicts a partial cross-sectional view of the fingerprint-sensing button.

FIG. 3C is a partial cross-sectional view of the button member 200, corresponding to a view along line 2B-2B in FIG. 2A, showing the cap subassembly attached to the button member 200. FIG. 3C also illustrates an optional bracing member 312 that may be positioned in the hollow post 222 to position the portion of the flexible circuit element 212 that is in the post, at least until the potting material 208 is introduced into the button member 200 and the hollow post 222. The bracing member 312 may be attached to the flexible circuit element 212 such that, when the flexible circuit element 212 is threaded through the hollow post 222, the bracing member 312 is appropriately located. As another example, the bracing member 312 may be attached to or otherwise positioned in the hollow post 222 prior to the flexible circuit element 212 being installed.

The bracing member 312 may help position the flexible circuit element 212 away from the inner surfaces of the hollow post 222. In this way, the flexible circuit element 212 may be protected from accidental electrical shorting to the button member 200, and/or other potential damage that may occur from contacting the inner surfaces of the hollow post 222 during assembly. The bracing member 312 may also maintain the flexible circuit element 212 in a target position within the hollow post 222 during the introduction and curing of the potting material 208 so that the flexible circuit element 212 does not move to an undesirable position within the post or otherwise become out-of-position during the potting process.

Figure 4A:
FIG. 4A depicts a side view of a portion of another fingerprint-sensing button.
Figure 4B:
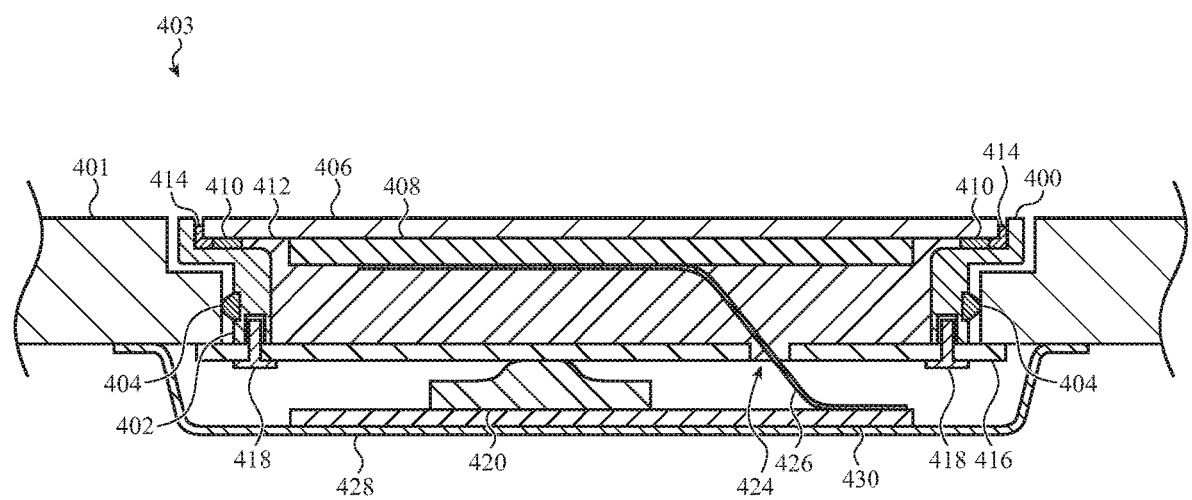
FIG. 4B depicts a partial cross-sectional view of the fingerprint-sensing button of FIG. 4A.

FIGS. 4A and 4B illustrate an example fingerprint-sensing button 403 (FIG. 4B) in which the button member defines a single elongated hollow post. FIG. 4A illustrates a side view of a button member 400 for use in the fingerprint-sensing button of FIGS. 4A-4B. The button member 400 defines a post 402, which may be hollow, as shown in FIG. 4B. The button member 400 also includes a sealing member 404. The sealing member 404 may be molded onto, adhered to, or otherwise attached to the button member 400. The sealing member 404 may be formed from or include an elastomeric material, such as a rubber or other polymer. The sealing member 404 may extend substantially entirely around the post 402 and may define a waterproof seal between the button member 400 and a housing member (e.g., the housing member 401, FIG. 4B, which may be analogous to the housing member 203).

FIG. 4B is a partial cross-sectional view of the fingerprint sensing button 403, corresponding to a view along line 2B-2B in FIG. 2A. Similar to the fingerprint-sensing button 120, the fingerprint-sensing button 403 may include a cap 406 attached to the button member 400 via an adhesive 410. A sealing material 414 may be positioned in a gap between the cap 406 and surfaces of the button member 400, and a potting material 412 may at least partially fill the hollow post 402. The potting material 412 may also at least partially encapsulate a flexible circuit element 426 and a sensing stack 408 (which may include a fingerprint sensing component, a substrate, and optionally other electrical or other components). In some cases, the fingerprint-sensing button 403 may also include an anti-roll mechanism, such as the anti-roll bar 239. The components of the fingerprint-sensing button 403 may be embodiments of or otherwise similar to the corresponding components described with respect to the fingerprint-sensing button 120. Details of those components will be understood to apply equally to those of the fingerprint-sensing button 403, and as such their details will not be repeated here.

The fingerprint-sensing button 403 may also include a plate 416 coupled to the button member 400 (e.g., via fasteners 418 or any other suitable attachment component(s) or technique(s)). The plate 416 may overlap a portion of the housing member 401 to retain the button member 400 to the device. The plate 416 may also define a hole 424 through which the flexible circuit element 426 may extend. The plate 416 may also be configured to contact an input sensor 420, such as a dome switch, capacitive force sensor, strain gauge, or the like. When the button member 400 is pressed, the button member 400 may compress or otherwise impart a force on the input sensor 420, which the device may recognize as an input and perform an appropriate action. The input sensor 420 may be conductively coupled to a circuit element (e.g., a flexible circuit element) 430, which is also conductively coupled to other components of the device (e.g., a processor). The flexible circuit element 426 may also be conductively coupled to the circuit element 430, thereby facilitating a conductive coupling between the fingerprint sensing component and other components of the device (e.g., a processor). A frame 428 may be coupled to the housing member 401 and may support the input sensor 420 and the circuit element 430.

Figure 5:
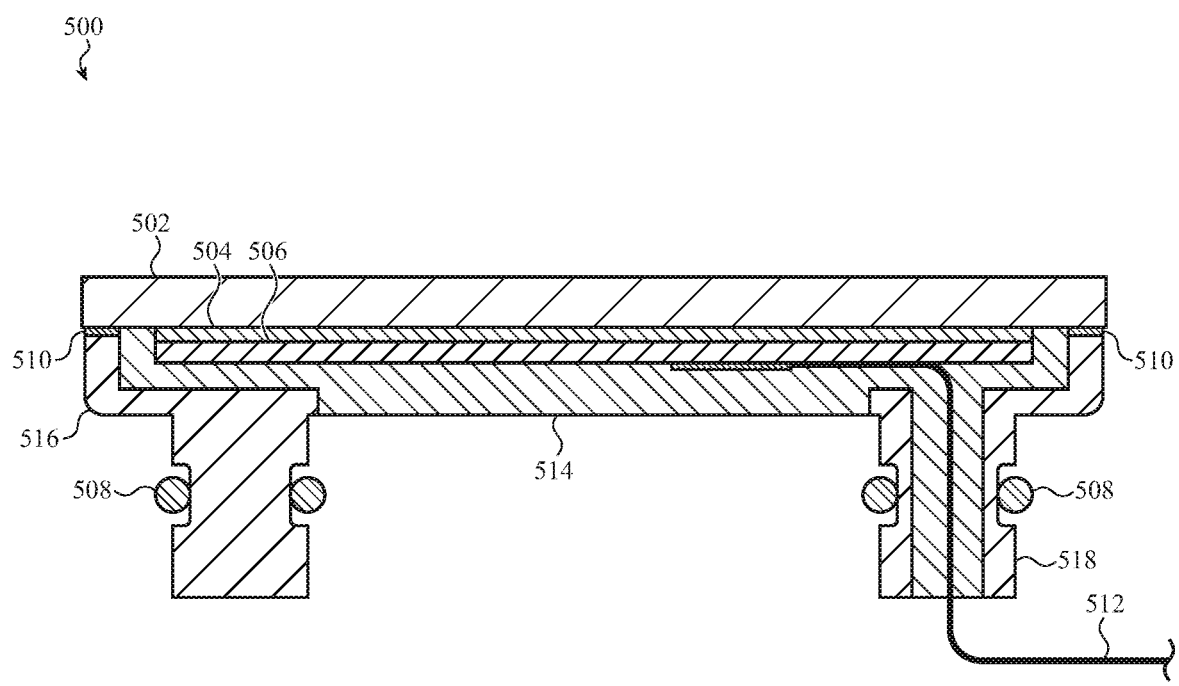
FIG. 5 depicts a button assembly for use with a fingerprint-sensing button.

FIG. 5 is a partial cross-sectional view of an example configuration for a button assembly 500 that includes a button member and cap of a fingerprint-sensing button. In particular, while other button members described herein define a rim that surrounds the sides of the cap (and optionally defines a ground path to a user's finger), FIG. 5 illustrates an example button member in which the cap is not surrounded by a rim of the button member.

For example, the button assembly 500 includes a cap 502 that is attached, along the bottom surface of the cap 502, to a button member 516 by an adhesive 510. The adhesive 510 may be configured to define a waterproof seal between the cap 502 and the button member 516. Notably, the sides of the cap 502 are exposed and/or are not surrounded by a rim or other structure of the button member 516. By omitting the rim, a fingerprint-sensing button using the configuration shown in FIG. 5 may have a smaller outside dimension and/or occupy less volume than a fingerprint-sensing button that includes a rim around the outer periphery of the cap.

The button member 516 of FIG. 5 also defines a hollow post 518 through which a flexible circuit element 512 may extend. A potting material 514 may also at least partially fill the hollow post and at least partially encapsulate the flexible circuit element 512 and a fingerprint sensing component 504 and/or substrate 506. The potting material 514 may define a waterproof seal within the hollow post 518, and the sealing members 508 may be coupled to the posts of the button member 516 to define a waterproof seal between the button member 516 and a housing of a device.

The components shown in FIG. 5 (e.g., the cap 502, adhesive 510, potting material 514, fingerprint sensing component 504, substrate 506, sealing members 508, flexible circuit element 512) may be embodiments of or otherwise similar to the corresponding components described with respect to other fingerprint-sensing buttons described herein. Details of those components will be understood to apply equally to those shown in FIG. 5, and as such their details will not be repeated here.

Figure 6A:
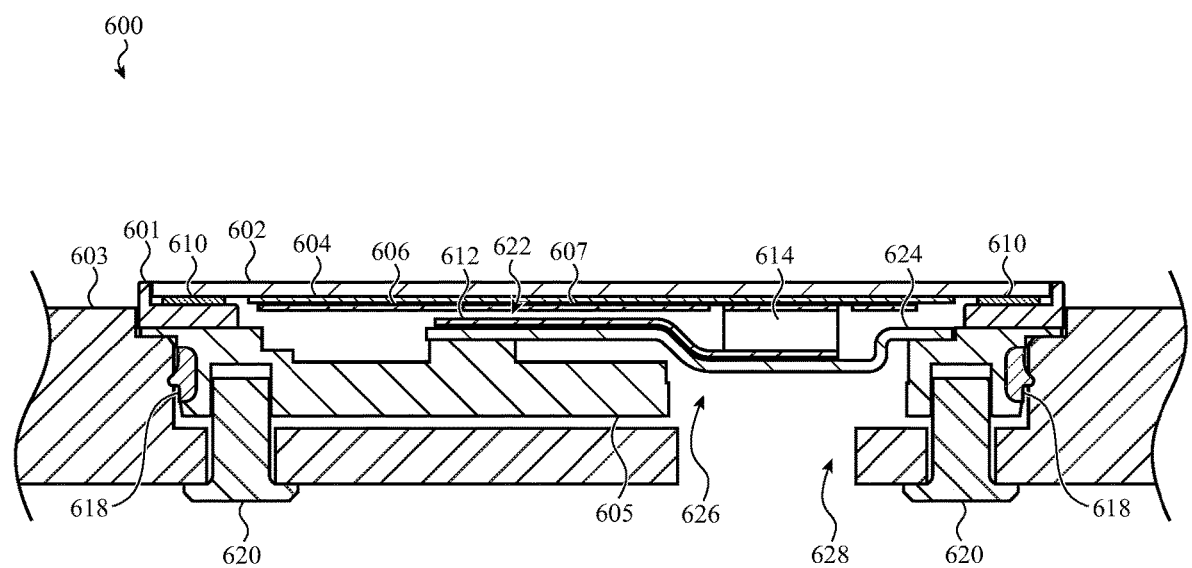
FIG. 6A depicts a partial cross-sectional view of a portion of another fingerprint-sensing button.
Figure 6B:
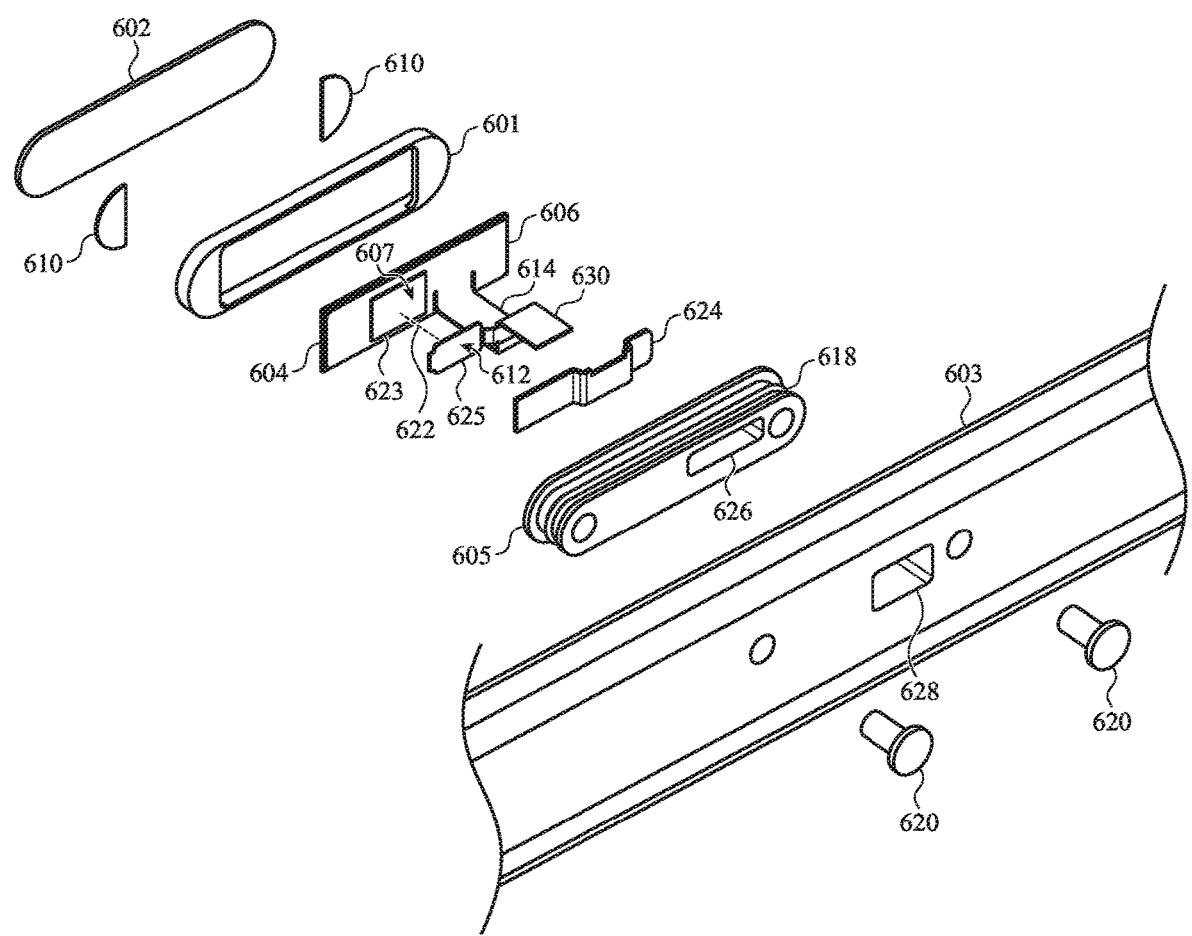
FIG. 6B depicts a partial exploded view of a device including the fingerprint-sensing button of FIG. 6A.

As described above, button functions may be provided in part by input sensors, such as dome switches, that are actuated in response to a force being applied to a button member. In some cases, the input sensors use force sensing technologies such as capacitive force sensors to detect force inputs. As shown in FIGS. 2B and 4B, such force sensors may be positioned below a movable button member, to be actuated by movement of the button member or force applied by the button member. FIGS. 6A-6B illustrate another example integration of a capacitive force sensor in a fingerprint-sensing button.

FIG. 6A is a partial cross-sectional view of a fingerprint sensing button 600, along a line corresponding to FIG. 2B-2B in FIG. 2A. FIG. 6B is a partial exploded view of a device including the fingerprint sensing button 600. The fingerprint sensing button 600 includes a button member that includes a chassis portion 601 and a base portion 605. The chassis portion 601 and base portion 605 may be coupled together via adhesives and/or mechanical fasteners (e.g., screws, latches, mechanical interlocks, etc.). A sealing member 618 may be molded onto, adhered to, or otherwise attached to the base portion 605. The sealing member 618 may be formed from or include an elastomeric material, such as a rubber or other polymer. The sealing member 618 may extend substantially entirely around the base portion 605 and may define a waterproof seal between the base portion 605 and a housing member, such as the housing member 603, which may be analogous to the housing member 203.

The button member, and more particularly the base portion 605 of the button member, may be secured to the housing member 603 via fasteners 620, and/or via any other suitable attachment system or technique (e.g., adhesives, mechanical interlocks, clips, rivets, etc.). Whereas the fingerprint-sensing buttons shown in FIGS. 2B and 4B are configured to move (e.g., translate) relative to a housing member so that an input sensor can be compressed, moved, or otherwise subjected to a force, the button member in FIG. 6A may be fixed in position relative to the housing member 603. In this example, the force sensor (or a portion thereof) may be integrated into the button member such that any motion or deformation necessary to detect a force is provided within the button member itself. For example, as described herein, a force applied to the button member (e.g., the cap 602) may result in a deformation or deflection of the cap 602 relative to another structure of the button member. A force sensor may detect the change in the size of the gap to determine whether a threshold force has been reached.

The fingerprint sensing button 600 also includes a cap 602 and a fingerprint sensing component 604 below the cap 602. The cap 602 and fingerprint sensing component 604 may be similar to or embodiments of other caps and fingerprint sensing components described herein, and the details of those components are not repeated here for brevity. The fingerprint sensing component 604 may be conductively coupled to a flexible circuit element 606, such as a flexible circuit board, that conductively couples the fingerprint sensing component 604 to other components of a device (e.g., a processor).

The cap 602 may be attached to the chassis portion 601 via a compliant adhesive component 610. The compliant adhesive component 610 may include multiple layers of material to provide the target adhesive and compliant properties to the joint between the cap 602 and the chassis portion 601. For example, the compliant adhesive component 610 may include a complaint material, such as an elastomer foam, sandwiched between two layers of adhesive (e.g., heat sensitive adhesive, pressure sensitive adhesive, or the like). The compliant adhesive component 610 may both attach the cap 602 to the chassis portion 601, while also allowing the cap 602 to move relative to the chassis portion 601 (e.g., towards the chassis portion 601) when a force is applied to the cap 602.

As noted above, the fingerprint-sensing button 600 may detect forces applied to the cap 602 by detecting a deformation or deflection of the cap 602 relative to the housing. This may be facilitated by a capacitive gap sensor. As shown in FIGS. 6A and 6B, a capacitive gap sensor may be implemented by a first electrode 623 or set of electrodes (FIG. 6B) positioned at and/or integrated with a first sensing portion 607 of the flexible circuit element 606, and a second electrode 625 or set of electrodes (FIG. 6B) positioned at and/or integrated with a second sensing portion 612 of the flexible circuit element 606. The second sensing portion 612 and the first sensing portion 607 may be separated by a gap 622 (which may be an air-gap or it may include a compliant material such as a foam, elastomer, potting material, or the like). The second sensing portion 612 of the flexible circuit element 606 may be positioned on a bracket 624, which is secured to the base portion 605. The bracket 624 supports the second sensing portion 612 of the flexible circuit element 606 such that a force applied to the cap 602 causes the gap 622 to be decreased (e.g., either by the cap 602 being deflected or deformed downwards while the bracket 624 and the second sensing portion remain stationary, or by the cap 602 deflecting or deformed downwards more than the bracket 624 and second sensing portion are deflected downwards).

When a force is applied to the cap 602, the gap 622 between the first and second electrodes 623, 625 may change (e.g., reduce), thus producing a change in capacitance that is detectable by one or both of the first and second electrodes 623, 625. While the foregoing describes a capacitive gap sensor, other types of force sensors may be implemented in the button member to detect changes in the gap 622. For example, force sensors that use strain gauges, piezoelectric or piezoresistive materials, dome switches, or the like, may be positioned between the cap 602 and the bracket 624.

As noted above, the first and second electrodes 623, 625 of the force sensor may be conductively coupled to different portions of the same flexible circuit element 606. To facilitate the use of a single flexible circuit element, the flexible circuit element 606 may define a loop portion 614 that extends from the portion of the flexible circuit element 606 that is attached to the cap 602, to the portion of the flexible circuit element 606 that is attached to the bracket 624. The loop portion 614 may flex or bend during input events when an input force pushes the cap 602 downwards.

The flexible circuit element 606 also defines a tail portion 630 (FIG. 6B) that facilitates conductive coupling of the fingerprint sensing component 604 and the first and second electrodes 623, 625 (or any other suitable force sensing components that may be coupled to the flexible circuit element 606) to other components within the device. The tail portion may extend through a hole 626 defined in the base portion 605, as well as a hole 628 defined in the housing member 603. The tail portion 630 may be coupled to another circuit element (e.g. a circuit board) within the device.

As noted above, the sealing member 618 defines a waterproof seal between the base portion 605 and the housing member 603. In some cases, a sealing material, such as the sealing material 248 described above, may be provided between the cap 602 and the chassis portion 601 to define a waterproof seal between the cap 602 and the chassis. A potting material may also be introduced to fill gaps and/or voids within the button member, thereby preventing or limiting ingress of water into the button member, and also provide a barrier around the internal components of the fingerprint-sensing button 600. In cases where a potting material is used, the potting material may be sufficiently compliant to allow the cap 602 to deform or deflect relative to the bracket 624 to facilitate the force sensing operations described above.

In the foregoing discussion, flexible circuit elements may be used to conductively couple components of fingerprint sensing buttons to other components within a device. In some cases, the flexible circuit elements, or portions thereof, may employ other types of conductive members. For example, wires, wire bundles, or other flexible conductors may also be used. In some cases, rigid circuit boards may be used in place of portions of flexible circuit elements. For example, with reference to FIGS. 6A-6B, the first and second sensing portions 607, 612 of the flexible circuit element 606 may use rigid circuit substrates, which may be coupled together via a loop portion that includes a flexible circuit element.

Figure 7:
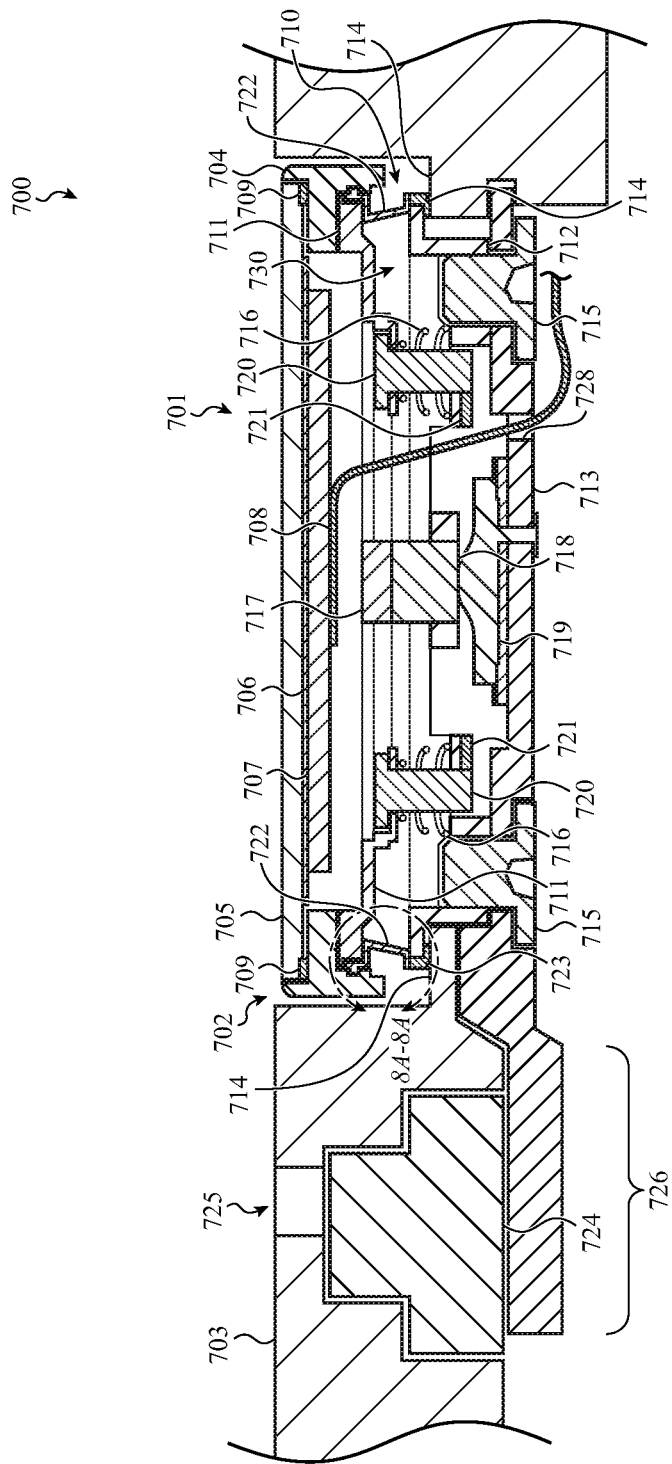
FIG. 7 depicts a partial cross-sectional view of a device, showing another example fingerprint-sensing button.

FIG. 7 depicts a partial cross-sectional view of a device 700 with another example fingerprint-sensing button 701 that may be used in an electronic device. The fingerprint-sensing button 701 may be an embodiment of the fingerprint-sensing button 120 and may perform the same or similar functions as other fingerprint-sensing buttons described herein. For example, the fingerprint-sensing button 701 may be operable to receive inputs (e.g., button presses), which can control or change various operations and functions of a device (e.g., change speaker volume, activate or deactivate a display, change a device mode, etc.). The fingerprint-sensing button 701 may also include a fingerprint sensor or components thereof, which may be configured to capture an image or other representative data of a finger that is in contact with the fingerprint-sensing button 701 (e.g., for authenticating a user). The electronic device 700 may be a tablet computer, mobile phone, smart watch, laptop or notebook computer, or the like. It will be understood that components, features, functions, and/or other aspects of other fingerprint buttons described herein may apply equally to the fingerprint-sensing button 701.

The fingerprint-sensing button 701 includes a button structure 702 that includes a chassis 704 and a cap 705 attached to the chassis 704. The chassis 704 may be formed from aluminum, stainless steel, titanium, ceramic, an amorphous metal, a polymer, or any other suitable material(s). The cap 705 may be attached to the chassis 704 via an adhesive 709. The adhesive 709 may be a heat-activated adhesive, such as a heat-activated film, or any other suitable adhesive (e.g., a pressure-sensitive adhesive, an epoxy, etc.). The adhesive 709 may retain the cap 705 in place and securely attached to the chassis 704. In some cases, a sealing material, such as a curable liquid, may be introduced into a gap or space between the cap 705 and the chassis 704. The sealing material may help prevent liquids or other materials, such as water, sweat, lotions, sunscreen, or the like, from getting into the space between the cap 705 and the chassis 704, which may help improve the integrity and reliability of the fingerprint sensing components of the fingerprint-sensing button 701. Sealing materials between a cap and a chassis are described in greater detail with respect to FIG. 2D, and those details will be understood to apply equally to the cap 705 and the chassis 704.

The cap 705 may cover a fingerprint-sensing component 706, and may define an input surface of the fingerprint-sensing button 701. A user may touch the input surface so that his or her fingerprint can be imaged by the fingerprint sensor for user authentication. When the fingerprint-sensing button 701 is being operated as a conventional button, the user may also contact the input surface to provide the requisite input or actuation force to the fingerprint-sensing button 701. The cap 705 may be formed from sapphire, glass, ceramic, glass ceramic, plastic, or another suitable material. The cap 705 may be a single piece of material or multiple components assembled together. The cap 705 may be formed of a material or materials that permit biometric sensing therethrough. For example, if the fingerprint sensor of the fingerprint-sensing button 701 uses capacitive sensing, the cap 705 may be a dielectric material (e.g., glass, sapphire). The cap 705 may have a thickness between about 100 to about 200 microns. In some cases, the cap 705 may include one or more layers of ink, dye, coatings, films, or other materials. Such layers may be used to provide optical masking, cosmetic coloring, shielding, or the like. The thickness of the cap 705 with the one or more layers of material may be between about 200 and about 300 microns thick.

The fingerprint sensing component 706 (or other biometric sensing component) may be a capacitive sense layer that is configured to capture an image of a fingerprint of a user to authenticate the user. The fingerprint sensing component 706 may be coupled to a circuit component 707, and a flexible circuit element 708 may be conductively coupled to the fingerprint sensing component 706 (optionally via conductors of the circuit component 707). The circuit component 707 may be a system-in-package that includes multiple electronic components in a single carrier. For example, the system-in-package circuit component 707 may include electronic components such as a processor, memory, and/or other components used for biometric sensing on a single substrate. The flexible circuit element 708 may conductively couple the fingerprint sensing component 706 (or other biometric sensing component) to a component within the housing of the device, in the same or similar manner to the flexible circuit element 212 described above.

The fingerprint sensing component 706 and the circuit component 707 may be attached to the cap 705, such as via adhesive. In some cases, neither the fingerprint sensing component 706 nor the circuit component 707 contact the chassis 704.

The button member 702 may be coupled to a compressible support assembly 710. The button member 712 may be attached via adhesive, fasteners, fusion bonds (e.g., welding), staking (e.g., heat staking), brazing, soldering, or the like. For example, an upper surface of the compressible support assembly 710 (e.g., an upper surface of a movable member 711) may be adhered to a bottom surface of the chassis 714.

The compressible support assembly 710 provides multiple functions to the fingerprint-sensing button 701. For example, the compressible support assembly 710 biases the button structure 702 towards an unactuated position (e.g., fully extended and/or undepressed), while also retaining the button structure 702 to the device. The compressible support assembly 710 also transfers input forces applied to the button structure 702 to an input sensor. Further, the compressible support assembly 710 acts as a multi-interface sealing structure to inhibit ingress of water, liquids, and/or other contaminants into the device. In some cases, the seals defined by the compressible support assembly 710 are waterproof seals.

The compressible support assembly 710 includes a movable member 711 and a stationary member 712. The movable member 711 is coupled to and supports the button structure 702. For example, a bottom side of the chassis 704 may be adhered to or otherwise attached to an upper surface of the movable member 711. The stationary member 712 may act as one side of a clamping structure that secures the compressible support assembly 710, and thus the button structure 702, to the device housing. For example, as shown in FIG. 7, the stationary member 712 and an inner bracket 713 may together act as a clamping structure that engages or clamps onto a portion of the housing 703. For example, the stationary member 712 and the inner bracket 713 may capture flanges 714 of the housing 703 between clamping surfaces of the stationary member 712 and the inner bracket 713. Fasteners 715 (e.g., screws) may secure the stationary member 712 to the inner bracket 713 and provide the clamping force that is imparted to the flanges 715 and that retains the stationary member 712 and the inner bracket 713 to the housing 703.

The compressible support assembly 710 also includes biasing springs 716 that bias the movable member 711 (and thus the button structure 702) towards an unactuated position (e.g., fully extended and/or undepressed). The biasing springs 716 may be positioned between the movable member 711 and the stationary member 712, and an input force applied to the button structure 702 may cause the biasing springs 716 to be compressed between the movable member 711 and the stationary member 712. The biasing springs 716 may be coil springs (as shown), or any other suitable type of spring or resilient member or material (e.g., leaf springs, beam springs, elastomer, etc.).

The movable member 711 may be retained to the stationary member 712 via retention pins 720. The retention pins 720 may include a flange or other feature that engages the movable member 711 to limit its travel in one direction (e.g., outwards or towards an unactuated position). The biasing springs 716 may bias the movable member 711 against the retention pins 720, thereby defining the outward-most position of the button structure 702 (e.g., defining the unactuated position). The retention pins 720 may be attached to the stationary member 712. For example, retention clips 721 (e.g., c-clips or e-clips) may engage terminal ends of the retention pins to retain the retention pins 720 to the stationary member 712. In some cases, the retention pins 720 are fixed to the stationary member 712 via the retention clips 720.

The movable member 711 may be configured to actuate an input sensor 719, such as a dome switch (as shown), capacitive force sensor, strain gauge, or the like. The input sensor 719 may be attached to or mounted on the inner bracket 713. When the button structure 702 is pressed, the button structure 712, and thus the movable member 711 that is attached to the button structure 702, may compress or otherwise impart a force on the input sensor 719, which the device may recognize as an input and perform an appropriate action. The input sensor 719 may be conductively coupled to a circuit element via one or more electrical connectors (e.g., vias), which may extend through an opening or hole in the inner bracket 713, which is also conductively coupled to other components of the device (e.g., a processor).

The movable member 711 may include or define an actuation structure 717 that engages a plunger 718 to impart the force on the input sensor 719 when the button is pressed. In some cases, the plunger 718 is secured to the actuation structure 717 (e.g., via adhesive), while in some cases it contacts the actuation structure 717 but is not attached. In some cases, the movable member 711 includes an actuation structure 717 that extends fully to the input sensor 719 to engage the input sensor 717 directly.

The compressible support assembly 710 also seals the fingerprint-sensing button 701 to inhibit ingress of water, liquids, or other contaminants into the device. More particularly, the compressible support assembly 710 seals several interfaces of the fingerprint-sensing button 701, while leaving a large sealed environment in which electrical and mechanical components may be positioned. For example, the compressible support assembly 710 includes a first seal 722, shown here as a skirt seal (and sometimes referred to as a skirt seal 722), that is coupled to the movable member 711 and seals an interface between the chassis 704 and the movable member 711. The skirt seal 722 includes a seal wall 801 that is configured to collapse, buckle, or otherwise deform when the button structure 702 is pressed (e.g., to actuate the input sensor 719), while keeping the sealed environment enclosed during button actuation. The compressible support assembly 710 also includes a second seal 723 that is coupled to the stationary member 712 and is coupled to the first seal 722, and is configured to seal an interface between the stationary member 712 and the housing 703 (e.g., a surface of the flange 714). The first seal 722 and the second seal 723 are further described with respect to FIGS. 8A-8B.

As described above, the compressible support assembly 710 provides numerous mechanical and sealing functions to the fingerprint-sensing button 701. For example, the compressible support assembly 710 biases the button structure 702 to an unactuated position, retains the button structure 702 to the device housing 703, serves as part of a clamping structure that secures the button structure 702 to the device housing, facilitates force transfer to an input sensor, provides a tactile response to a user when the button is being pressed (e.g., via the springs), and also seals multiple interfaces between components of the fingerprint-sensing button 701.

In some cases, the compressible support assembly 710 may be fully assembled prior to attachment to the chassis 704. For example, the movable member 711 may be inserted into a mold, and a polymer material may be introduced into the mold and against the movable member 711 to form the first seal 722. Subsequently, the stationary member 712 (and optionally the retention pins 720, biasing springs 716, and actuation structure) may be introduced into the mold (or a different mold) along with the movable member 711 and the first seal 722, and another polymer material (which may have the same or a different composition as the first seal 722) may be introduced into the mold and against both the first seal 722 and the stationary member 712 to define the second seal 723. Retention clips 721 may then be included to secure the retention pins 720 to the stationary member 712. This process may result in a pre-assembled compressible support assembly 710 that can be attached to the chassis 704 and secured to the housing 703 to efficiently and quickly provide mechanical button functionality and define reliable seals for the fingerprint-sensing button 701.

As described above, the compressible support assembly 710 defines a sealed chamber 730 below the button structure 702. The sealed chamber 730 is positioned over and/or encompasses holes formed through the housing 703. The holes in the housing 703 allow mechanical and/or electrical components to pass through into the interior of the housing 703. Thus, because the holes are within the sealed chamber 730, those components are protected from liquids, water, or other contaminants.

One such component that is in and/or passes through the sealed chamber 730 is a flexible circuit element 708. The flexible circuit element 708 is coupled to the circuit component 707 and passes through the sealed chamber 730 and into the device through a hole 728 in the inner bracket 713. The flexible circuit element 708 carries electrical signals between the circuit component 707 and other electrical components of the device 700 (e.g., a processor, main logic board, etc.). The electrical signals may include signals from the fingerprint sensing component 706. Because the sealed chamber 730 is sealed from the exterior environment, and because the sealed chamber 730 is relatively large (e.g., encompassing up to 90% or more of the area below the chassis 704), the flexible circuit element 708 can pass freely through the sealed chamber 730, optionally without additional sealing structures. Further, the large volume of the sealed chamber 730 allows sufficient room for the flexible circuit element 708 to flex or bend during button actuations, and allows the flexible circuit element 708 to be routed into the device housing 703 without tight bends or curves.

As described above, an inner bracket 713 may operate as one side of a clamping structure that secures the compressible support assembly 710 to the housing 703. In some cases, the inner bracket 713 also secures a microphone module 724 to the housing 703. More particularly, a wing portion 726 of the inner bracket 713 may be configured to extend along a portion of an interior surface of the housing that includes a recess for the microphone module 724. The wing portion 726 may hold the microphone module 724 in the recess. Notably, the same clamping configuration from the inner bracket 713 and the compressible support assembly 710 retains the microphone module 724 in place. More particularly, by clamping the flanges 714 of the housing 703 between the inner bracket 713 and the compressible support assembly 710, the wing portion 726 is rigidly held in the position that secures the microphone module 724 in place. In some cases, no additional fasteners are needed to retain the microphone module 724 in place in its recess. In some cases, a biasing member such as a foam pad is positioned between the wing portion 726 and the microphone module 724 to help bias the microphone module against the housing 703. The microphone module 724 may receive sound through a hole 725 formed through the housing 703.

Figure 8A:
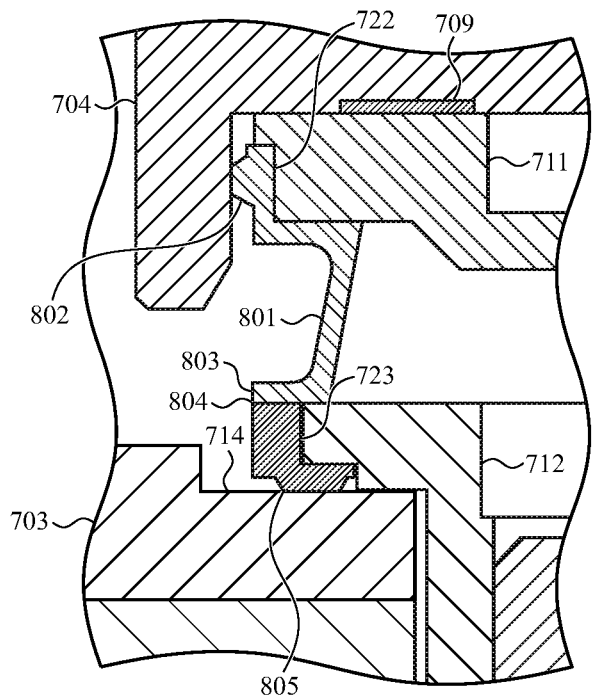
FIGS. 8A-8B depict a partial cross-sectional view of a portion of the fingerprint-sensing button of FIG. 7.
Figure 8B:
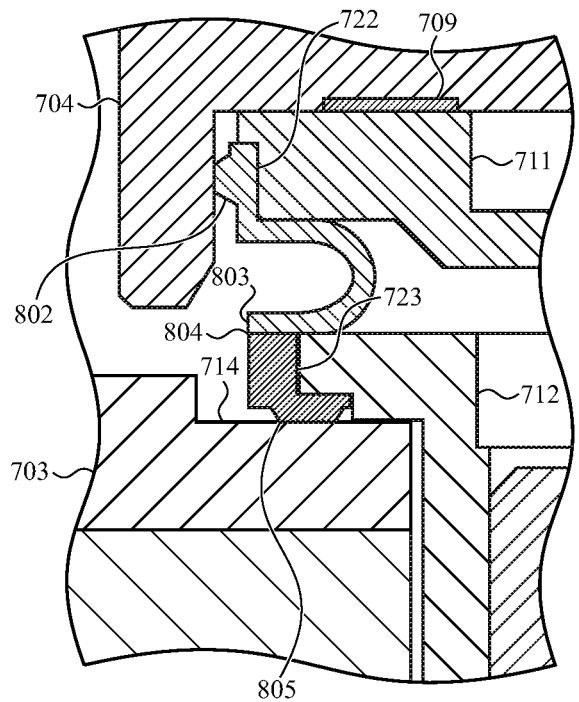

FIGS. 8A-8B depict a portion of the device 700 corresponding to area 8A-8A in FIG. 7, illustrating details of the first and second seals 722. FIG. 8A shows the button in an unactuated state, such as may occur when the fingerprint sensing button 701 is not being subjected to an input force (e.g., it is not being pressed). In this state, the biasing springs may be forcing the movable member 711 into its outward most position.

As shown in FIG. 8A, the first seal 722 is attached to the movable member 711 such as via injection molding, such that the first seal 722 is bonded to the movable member 711 and defines a water-tight seal between the first seal 722 and the movable member 711. The first seal 722 defines a first sealing feature 802 that contacts the chassis 704. The first sealing feature 802, which may be a protrusion, bump, or any other suitable shape or configuration, may seal against a surface of the chassis 704 to define a sealing interface between the first seal 722 and the chassis 704. The first sealing feature 802 may be deformed against the chassis 704 (e.g., compressed) due to the size of the first sealing feature 802 being larger than the gap between the sealing surface of the chassis 704 and the movable member 711.

The second seal 723 is attached to the stationary member 712 such as via injection molding, such that the second seal 723 is bonded to the stationary member 712 and defines a water-tight seal between the second seal 723 and the stationary member 712. Accordingly, the interface between the second seal 723 and the stationary member 712 may be water-tight. The second seal 723 defines a second sealing feature 805 that contacts the housing 703 (e.g., the flange 714 of the housing 703). The second sealing feature 805, which may be a protrusion, bump, or any other suitable shape or configuration, may seal against a surface of the housing (e.g., the flange 714) to define a sealing interface between the second seal 723 and the housing 703. The second sealing feature 805 may be deformed against the flange 714 (e.g., compressed) due to the size of the second sealing feature 805 being larger than the gap between the sealing surface of the flange 714 and the stationary member 712.

The first seal 722 is also attached to the stationary member 712, and optionally attached to the second seal 723. In particular, the second seal 723 may be attached to an end portion 803 of the first seal 722, along a bond interface 804 (e.g., where the first and second seals 722, 723 are bonded to each other). The attachment between the first seal 722 and the stationary member 712 and second seal 723 may result from the injection process, in which the second seal 723 bonds to the first seal 722 and to the stationary member 712. The bonds between the first seal 722 and the movable member 711, between the first seal 722 and the second seal 723, and between the second seal 723 and the stationary member 712 (as well as the sealing interfaces provided by the first and second sealing features) defines a boot-like seal around the periphery of the compressible support assembly 710, and thus defines the sealed chamber 730. The sealed chamber 730 is thus sealed against ingress of water, liquids, or other contaminants, and allows a large area below the button structure 702 to be open to the interior of the housing. This large, environmentally sealed area can contain many mechanical and electrical components that would otherwise not be suitable for free environmental contact (e.g., flexible circuit elements, input sensors, fingerprint sensing components, circuit boards, etc.).

FIG. 8B illustrates the fingerprint-sensing button 701 in a depressed or actuated state, such as may occur when a user presses on the button member to provide an input to a device. In this state, the button structure 702 (including the chassis 704) and the movable member 711 are moved downwards (e.g., towards the stationary member 712), resulting in the first seal 722 deforming along a seal wall 801. Because the sealing wall 801 deforms during button actuation, the seal remains intact during the button actuation. Moreover, because the sealing wall 801 deforms, neither of the sealing interfaces have to move or slide along a sealing surface during button actuation. More particularly, during button actuation and movement, the first sealing feature 802 remains static against the sealing surface of the chassis 704, while the second sealing feature 805 remains static against the sealing surface of the ledge 714. Thus, movement of the button does not apply forces to or produce friction on the sealing features, leading to less wear and greater durability. Further, because the sealing interfaces are static, the seals may be stronger or less likely to allow ingress of liquid, water, etc. Thus, the configuration of a deformable sealing wall 801 with static sealing features provides a robust seal that may have a greater sealing effect and durability as compared to seals that move or slide against surfaces during actuation.

Figure 9:
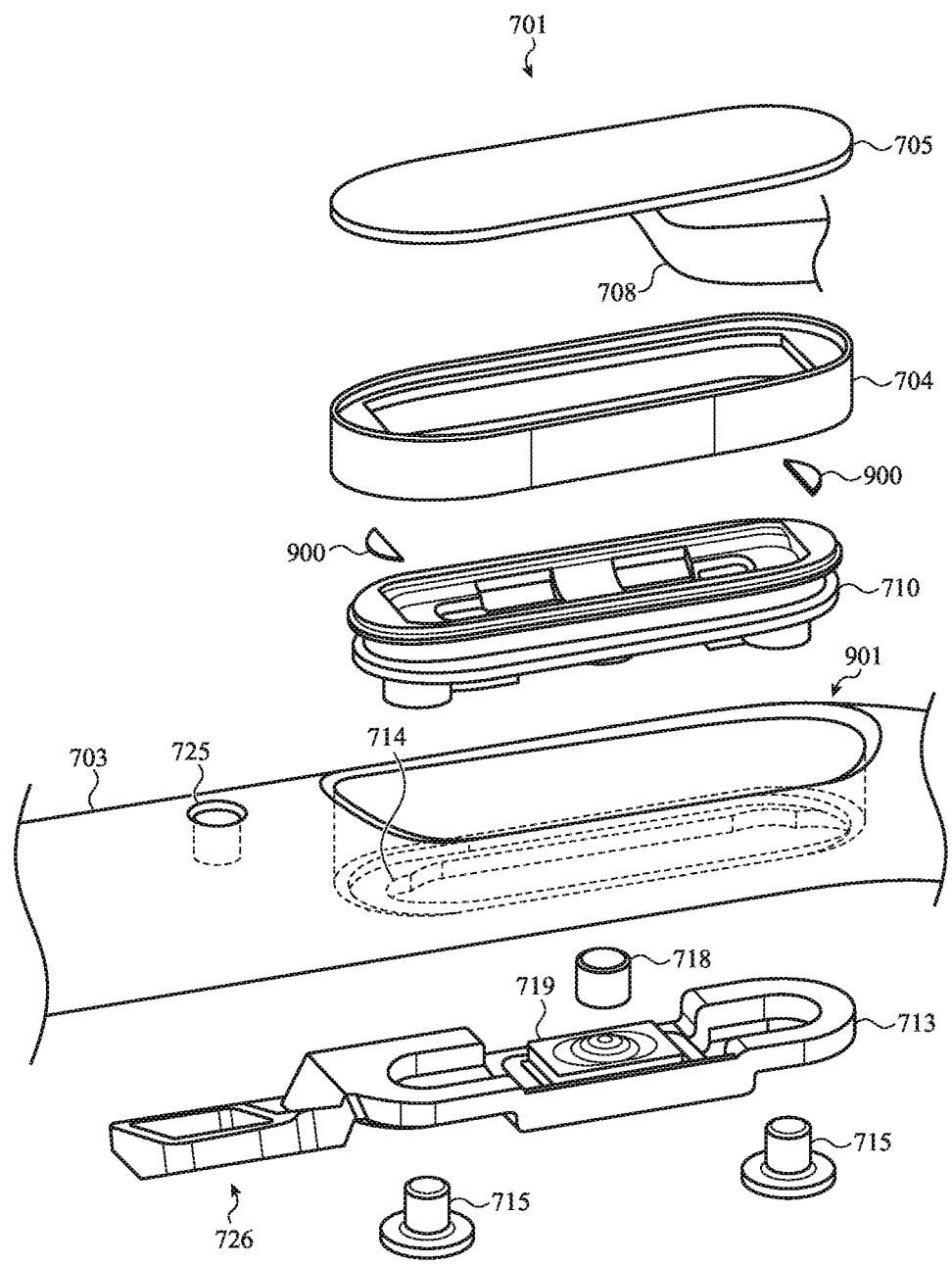
FIG. 9 depicts a partial exploded view of the fingerprint-sensing button of FIG. 7.

FIG. 9 is a partial exploded view of the fingerprint-sensing button 701, illustrating an example of how the components of the fingerprint-sensing button 701 and the device housing 703 are arranged. FIG. 9 may also illustrate how the fingerprint-sensing button 701 may be assembled.

As shown in FIG. 9, the cap 705, which may have circuit components including a flexible circuit element 708 coupled to a bottom surface thereof, is coupled to a top side of the chassis 704. The compressible support assembly 710 may also be coupled to a bottom side of the chassis 704. The compressible support assembly 710 may be secured to flange or other mounting surface of the chassis 704 via adhesive 900 (which may be adhesive film, a curable liquid adhesive, or the like). The process of attaching the compressible support assembly 710 to the chassis 704 results in the first sealing feature 802 (FIGS. 8A-8B) being forced against the chassis 704 to form a watertight seal between the chassis 704 and the first seal 722. Further, during the coupling of the cap 705, chassis 704, and compressible support assembly 710, the flexible circuit element 708 may be routed through the central hole of the chassis 704 and through the sealed chamber 730 of the compressible support assembly 710.

Once coupled together, cap 705, chassis 704, and compressible support assembly 710 may be positioned in a hole 901 in the housing 703, and the flexible circuit element 708 may be routed through a hole in the inner bracket 713. The fasteners 715 may be installed to secure the inner bracket 713 (with the input sensor 719) to the compressible support assembly 710, thereby clamping the flange 714 of the housing 703 between the compressible support assembly 710 and the inner bracket 713 and securing the fingerprint-sensing button 701 to the housing 703. FIG. 9 further illustrates how the configuration of the flange 714, the compressible support assembly 710, and the inner bracket 713 result in a clamping interface that extends around the wall of the hole 901 and around an outer periphery of the compressible support assembly 710. Accordingly, the clamping interface has a ring-like shape that extends around a large sealed area through which components may pass while remaining within the sealed environment.

The process of clamping the flange 714 of the housing 703 between the compressible support assembly 710 and the inner bracket 713 also results in the second sealing feature 805 (FIGS. 8A-8B) being forced against the housing (e.g., the flange 714) to form a watertight seal between the flange 714 of the housing 703 and the second seal 723. Further, as noted above, a microphone module may be positioned in a recess in the housing 703, such that attaching the inner bracket 713 to the compressible support assembly 710 results in the wing portion 726 of the inner bracket 713 retaining the microphone module in place.

Figure 10:
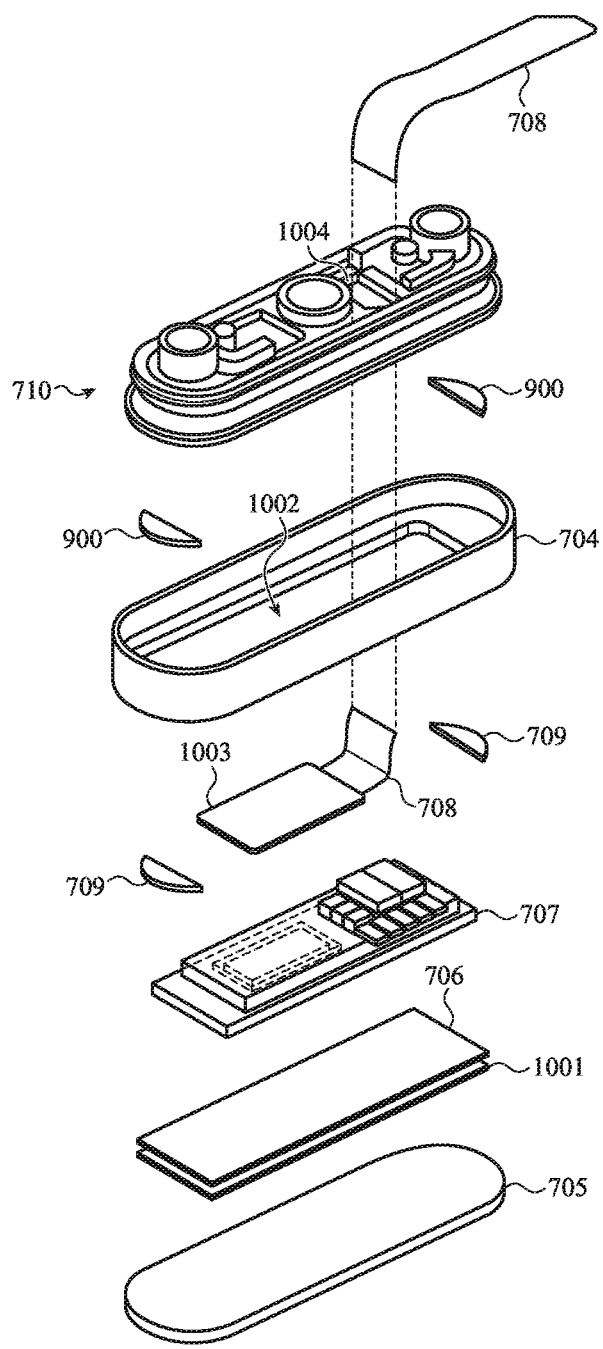
FIG. 10 depicts another partial exploded view of the fingerprint-sensing button of FIG. 7.

FIG. 10 is another partial exploded view of the fingerprint-sensing button 701, illustrating how the components of the fingerprint-sensing button 701 are arranged. As shown in FIG. 10, the fingerprint-sensing component 706 may be attached to a bottom side surface of the cap 705 with an adhesive 1001, such as an adhesive film, a curable liquid adhesive, or the like. The circuit component 707, which may be a system-in-package circuit component, may be conductively coupled to the fingerprint-sensing component 706. For example, the fingerprint-sensing component 706 may include one or more electrode layers for capacitively sensing details of a user's fingerprints, and the circuit component 707 may include processors, memory, and/or other circuitry that are conductively coupled to the electrode layers (and/or other components of the fingerprint-sensing component 706) to facilitate fingerprint sensing. The circuit component 707 may be attached to the fingerprint-sensing component 706 with an adhesive, such as an adhesive film, a curable liquid adhesive, or the like.

The flexible circuit element 708 may include a connector 1003 that conductively couples to the circuit element 707 and facilitates the flexible circuit element 708 in carrying electrical signals and/or other communications between the circuit element 707 and other electronic components of a device. In order to reach the relevant electronic components within a device, the flexible circuit element 708 may be routed through a hole 1002 or open central region of the chassis 704, and through a hole 1004 in the compressible support assembly 710. Thus, as described more fully herein, the flexible circuit element 708 extends through the sealed chamber 730 and, more generally, is within the sealed environment defined by the sealing components of the fingerprint-sensing button 701.

Figure 11:
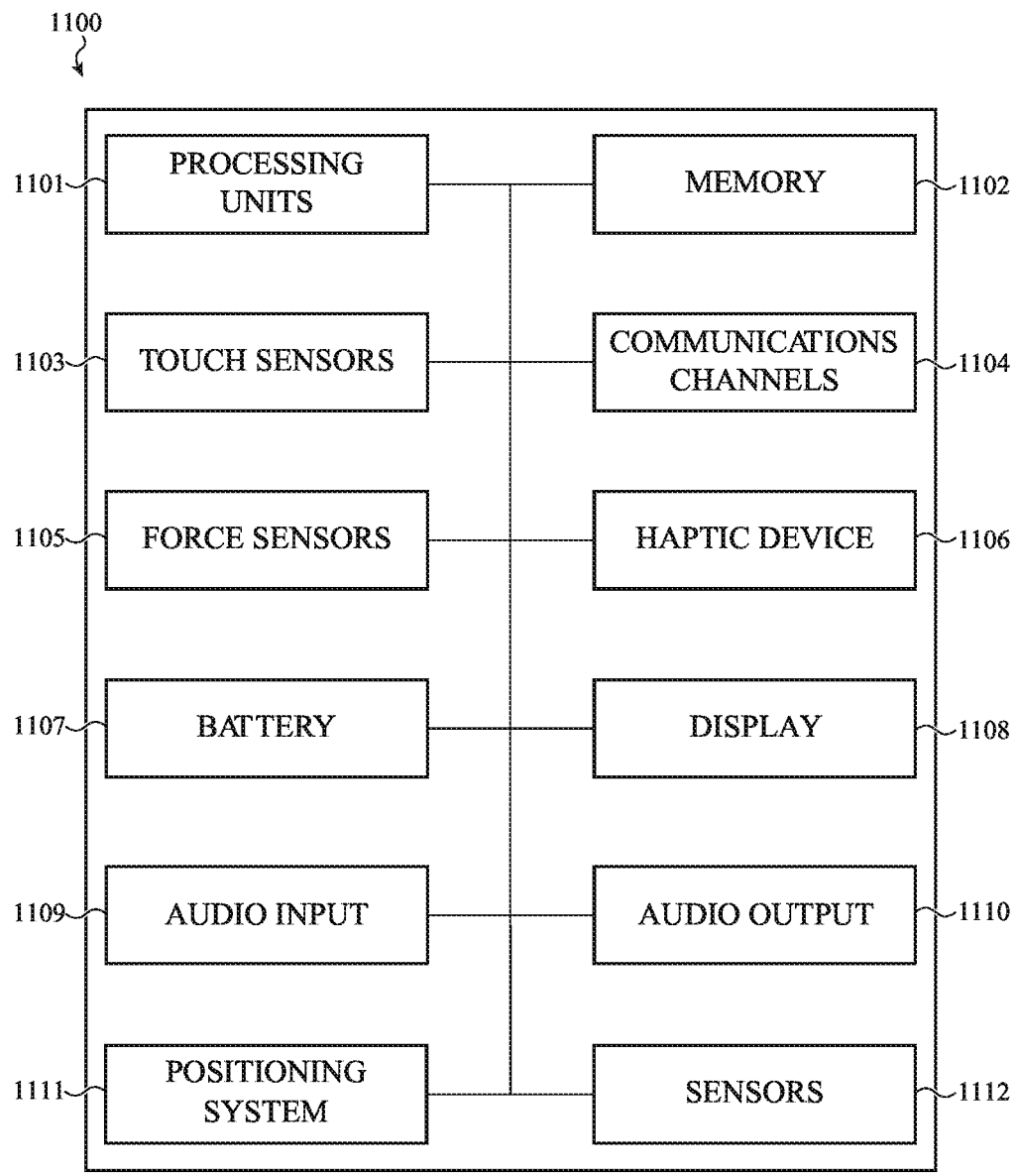
FIG. 11 depicts a schematic diagram of an example electronic device.

FIG. 11 depicts an example schematic diagram of an electronic device 1100. The electronic device 1100 may be an embodiment of or otherwise represent the device 100. The device 1100 includes one or more processing units 1101 that are configured to access a memory 1102 having instructions stored thereon. The instructions or computer programs may be configured to perform one or more of the operations or functions described with respect to the electronic devices described herein. For example, the instructions may be configured to control or coordinate the operation of one or more displays 1108, one or more touch sensors 1103, one or more force sensors 1105, one or more communications channels 1104, one or more audio input systems 1109, one or more audio output systems 1110, one or more positioning systems 1111, one or more sensors 1112, and/or one or more haptic feedback devices 1106.

The processing units 1101 of FIG. 11 may be implemented as any electronic device capable of processing, receiving, or transmitting data or instructions. For example, the processing units 1101 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements. The processing units 1101 may be coupled to a logic board of the device 1100.

The memory 1102 can store electronic data that can be used by the device 1100. For example, a memory can store electrical data or content such as, for example, audio and video files, images, documents and applications, device settings and user preferences, programs, instructions, timing and control signals or data for the various modules, data structures or databases, and so on. The memory 1102 can be configured as any type of memory. By way of example only, the memory can be implemented as random access memory, read-only memory, Flash memory, removable memory, or other types of storage elements, or combinations of such devices. The memory 1102 may be coupled to a logic board of the device 1100.

The touch sensors 1103 may detect various types of touch-based inputs and generate signals or data that are able to be accessed using processor instructions. The touch sensors 1103 may use any suitable components and may rely on any suitable phenomena to detect physical inputs. For example, the touch sensors 1103 may be capacitive touch sensors, resistive touch sensors, acoustic wave sensors, or the like. The touch sensors 1103 may include any suitable components for detecting touch-based inputs and generating signals or data that are able to be accessed using processor instructions, including electrodes (e.g., electrode layers), physical components (e.g., substrates, spacing layers, structural supports, compressible elements, etc.) processors, circuitry, firmware, and the like. The touch sensors 1103 may be integrated with or otherwise configured to detect touch inputs applied to any portion of the device 1100. For example, the touch sensors 1103 may be configured to detect touch inputs applied to any portion of the device 1100 that includes a display (and may be integrated with a display). The touch sensors 1103 may operate in conjunction with the force sensors 1105 to generate signals or data in response to touch inputs. A touch sensor or force sensor that is positioned over a display surface or otherwise integrated with a display may be referred to herein as a touch-sensitive display, force-sensitive display, or touchscreen.

The force sensors 1105 may detect various types of force-based inputs and generate signals or data that are able to be accessed using processor instructions. The force sensors 1105 may use any suitable components and may rely on any suitable phenomena to detect physical inputs. For example, the force sensors 1105 may be strain-based sensors, piezoelectric-based sensors, piezoresistive-based sensors, capacitive sensors, resistive sensors, or the like. The force sensors 1105 may include any suitable components for detecting force-based inputs and generating signals or data that are able to be accessed using processor instructions, including electrodes (e.g., electrode layers), physical components (e.g., substrates, spacing layers, structural supports, compressible elements, etc.), processors, circuitry, firmware, and the like. The force sensors 1105 may be used in conjunction with various input mechanisms to detect various types of inputs. For example, the force sensors 1105 may be used to detect presses or other force inputs that satisfy a force threshold (which may represent a more forceful input than is typical for a standard "touch" input). Like the touch sensors 1103, the force sensors 1105 may be integrated with or otherwise configured to detect force inputs applied to any portion of the device 1100. For example, the force sensors 1105 may be configured to detect force inputs applied to any portion of the device 1100 that includes a display (and may be integrated with a display). The force sensors 1105 may operate in conjunction with the touch sensors 1103 to generate signals or data in response to touch- and/or force-based inputs. Force sensors 1105 may be integrated with buttons (e.g., the fingerprint-sensing buttons 120, 403, 600, 701) to detect inputs applied to the buttons.

The device 1100 may also include one or more haptic devices 1106. The haptic device 1106 may include one or more of a variety of haptic technologies such as, but not necessarily limited to, rotational haptic devices, linear actuators, piezoelectric devices, vibration elements, and so on. In general, the haptic device 1106 may be configured to provide punctuated and distinct feedback to a user of the device. More particularly, the haptic device 1106 may be adapted to produce a knock or tap sensation and/or a vibration sensation. Such haptic outputs may be provided in response to detection of inputs such as touch and/or force inputs, or events such as a successful (or unsuccessful) biometric authentication. The haptic outputs may be imparted to a user through the exterior surface of the device 1100 (e.g., via a glass or other surface that acts as a touch- and/or force-sensitive display or surface), or via an input member such as a button or biometric sensor (e.g., the fingerprint-sensing button 120, FIG. 1A).

The one or more communications channels 1104 may include one or more wireless interface(s) that are adapted to provide communication between the processing unit(s) 1101 and an external device. The one or more communication channels 1104 may include antennas (e.g., antennas that include or use the housing members of the housing 104 as radiating members), communications circuitry, firmware, software, or any other components or systems that facilitate wireless communications with other devices. In general, the one or more communications channels 1104 may be configured to transmit and receive data and/or signals that may be interpreted by instructions executed on the processing units 1101. In some cases, the external device is part of an external communication network that is configured to exchange data with wireless devices. Generally, the wireless interface may communicate via, without limitation, radio frequency, optical, acoustic, and/or magnetic signals and may be configured to operate over a wireless interface or protocol. Example wireless interfaces include radio frequency cellular interfaces (e.g., 2G, 3G, 4G, 4G long-term evolution (LTE), 5G, GSM, CDMA, or the like), fiber optic interfaces, acoustic interfaces, Bluetooth interfaces, infrared interfaces, USB interfaces, Wi-Fi interfaces, TCP/IP interfaces, network communications interfaces, or any conventional communication interfaces. The one or more communications channels 1104 may also include ultra-wideband interfaces, which may include any appropriate communications circuitry, instructions, and number and position of suitable UWB antennas.

As shown in FIG. 11, the device 1100 may include a battery 1107 that is used to store and provide power to the other components of the device 1100. The battery 1107 may be a rechargeable power supply that is configured to provide power to the device 1100. The battery 1107 may be coupled to charging systems (e.g., wired and/or wireless charging systems) and/or other circuitry to control the electrical power provided to the battery 1107 and to control the electrical power provided from the battery 1107 to the device 1100.

The device 1100 may also include one or more displays 1108 configured to display graphical outputs. The displays 1108 may use any suitable display technology, including liquid crystal displays (LCD), organic light emitting diodes (OLED) displays, active-matrix organic light-emitting diode displays (AMOLED), or the like. The displays 1108 may display graphical user interfaces, images, icons, or any other suitable graphical outputs. The display 1108 may correspond to the display 103 of FIG. 1A.

The device 1100 may also provide audio input functionality via one or more audio input systems 1109. The audio input systems 1109 may include microphones, transducers, or other devices that capture sound for voice calls, video calls, audio recordings, video recordings, voice commands, and the like.

The device 1100 may also provide audio output functionality via one or more audio output systems (e.g., speakers) 1110. The audio output systems 1110 may produce sound from voice calls, video calls, streaming or local audio content, streaming or local video content, or the like.

The device 1100 may also include a positioning system 1111. The positioning system 1111 may be configured to determine the location of the device 1100. For example, the positioning system 1111 may include magnetometers, gyroscopes, accelerometers, optical sensors, cameras, global positioning system (GPS) receivers, inertial positioning systems, or the like. The positioning system 1111 may be used to determine spatial parameters of the device 1100, such as the location of the device 1100 (e.g., geographical coordinates of the device), measurements or estimates of physical movement of the device 1100, an orientation of the device 1100, or the like.

The device 1100 may also include one or more additional sensors 1112 to receive inputs (e.g., from a user or another computer, device, system, network, etc.) or to detect any suitable property or parameter of the device, the environment surrounding the device, people or things interacting with the device (or nearby the device), or the like. For example, a device may include temperature sensors, biometric sensors (e.g., fingerprint sensors, photoplethysmographs, blood-oxygen sensors, blood sugar sensors, or the like), eye-tracking sensors, retinal scanners, humidity sensors, buttons, switches, lid-closure sensors, or the like.

To the extent that multiple functionalities, operations, and structures described with reference to FIG. 11 are disclosed as being part of, incorporated into, or performed by the device 1100, it should be understood that various embodiments may omit any or all such described functionalities, operations, and structures. Thus, different embodiments of the device 1100 may have some, none, or all of the various capabilities, apparatuses, physical features, modes, and operating parameters discussed herein. Further, the systems included in the device 1100 are not exclusive, and the device 1100 may include alternative or additional systems, components, modules, programs, instructions, or the like, that may be necessary or useful to perform the functions described herein.

As described above, one aspect of the present technology is the gathering and use of data available from various sources. The present disclosure contemplates that, in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above, below, over, under, left, or right (or other similar relative position terms), do not necessarily refer to an absolute position relative to an external reference, but instead refer to the relative position of components within the figure being referred to. Similarly, horizontal and vertical orientations may be understood as relative to the orientation of the components within the

What is claimed is:

1. A portable electronic device, comprising:
a housing member defining a side surface of the portable electronic device, a portion of the housing member defining a side wall of a hole extending through the housing member;
a button member positioned along the side surface and defining:
a chassis portion; and
a hollow post extending into the hole defined through the housing member;
a first waterproof seal defined between the hollow post and the side wall of the hole;
a biometric sensing component coupled to the chassis portion;
a flexible circuit element extending through the hollow post and conductively coupling the biometric sensing component to a component within the portable electronic device; and
a second waterproof seal defined within the hollow post.

2. The portable electronic device of claim 1, wherein:
the biometric sensing component is configured to capture a representation of a fingerprint of a user;
the portable electronic device is configured to authenticate the user using the representation of the fingerprint; and
the portable electronic device further comprises an input sensor configured to detect an input force applied to the button member.

3. The portable electronic device of claim 1, wherein the first waterproof seal comprises an O-ring.

4. The portable electronic device of claim 1, wherein the second waterproof seal comprises a potting material at least partially filling the hollow post.

5. The portable electronic device of claim 1, further comprising a sapphire cap attached to the chassis portion and covering the biometric sensing component.

6. The portable electronic device of claim 5, further comprising a third waterproof seal between the sapphire cap and the chassis portion.

7. The portable electronic device of claim 6, wherein:
the second waterproof seal is formed from a first curable liquid having a first viscosity; and
the third waterproof seal is formed from a second curable liquid having a second viscosity that is lower than the first viscosity.

8. A portable electronic device, comprising:
a housing member defining a side wall of a hole extending through the housing member;
a display;
a transparent cover over the display and coupled to the housing member;
a button member positioned along a side of the housing member and defining:
a chassis portion; and
a post extending from the chassis portion and positioned at least partially in the hole, the post defining a passage extending through the post from the chassis portion to an end of the post;
a biometric sensing component coupled to the chassis portion; and
a flexible circuit element extending through the passage and conductively coupling the biometric sensing component to a component within the portable electronic device.

9. The portable electronic device of claim 8, further comprising:
a sealing member in contact with an exterior surface of the post and the side wall of the hole and configured to inhibit ingress of liquid between the exterior surface of the post and the side wall of the hole; and
a potting material within the passage and at least partially encapsulating the flexible circuit element, the potting material configured to inhibit ingress of liquid through the passage.

10. The portable electronic device of claim 9, wherein the potting material at least partially encapsulates the biometric sensing component.

11. The portable electronic device of claim 8, wherein:
the hole is a first hole;
the housing member defines a second hole extending through the housing member; and
the button member further defines an additional post extending from the chassis portion and positioned in the second hole.

12. The portable electronic device of claim 11, wherein the additional post is a solid post.

13. The portable electronic device of claim 11, further comprising an anti-roll bar retained to the housing member and coupled to the post and the additional post, the anti-roll bar configured to maintain uniform travel of the post and the additional post during actuation of the button member.

14. The portable electronic device of claim 8, wherein the portable electronic device further comprises an input sensor configured to detect an input force applied to the button member.

15. The portable electronic device of claim 14, wherein the input sensor is a capacitive sensor.

16. A portable electronic device, comprising:
a housing defining a side surface of the portable electronic device;
a display at least partially within the housing;
a transparent cover over the display and coupled to the housing;
a button member positioned along the side surface and defining a hollow post extending into a hole defined through the housing;
a biometric sensing component coupled to the button member;
a cap covering the biometric sensing component and secured to the button member;
a flexible circuit element extending through the hollow post and electrically coupling the biometric sensing component to a component within the housing; and
a potting material at least partially encapsulating the flexible circuit element and the biometric sensing component and at least partially filling the hollow post.

17. The portable electronic device of claim 16, wherein the button member further defines a solid post extending into an additional hole defined through the housing.

18. The portable electronic device of claim 17, further comprising:
a first sealing member positioned between the hollow post and a first surface of the housing that defines the hole; and
a second sealing member positioned between the solid post and a second surface of the housing that defines additional hole.

19. The portable electronic device of claim 16, further comprising a sealing material positioned in a gap defined between the cap and the button member.

20. The portable electronic device of claim 16, wherein the biometric sensing component is a capacitive sensor of a fingerprint sensing system.

\* \* \* \* \*